(12) United States Patent
Yao

(10) Patent No.: US 10,302,493 B2
(45) Date of Patent: May 28, 2019

(54) SYSTEM AND METHOD FOR LIGHT OPTIMIZATION

(71) Applicant: SHENZHEN UNIVERSITY, Shenzhen, Guangdong (CN)

(72) Inventor: Qi Yao, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 15/573,510

(22) PCT Filed: Apr. 27, 2016

(86) PCT No.: PCT/CN2016/080365
§ 371 (c)(1),
(2) Date: Nov. 13, 2017

(87) PCT Pub. No.: WO2016/180235
PCT Pub. Date: Nov. 17, 2016

(65) Prior Publication Data
US 2018/0106675 A1  Apr. 19, 2018

(30) Foreign Application Priority Data

May 13, 2015 (CN) .......................... 2015 1 0241210
Aug. 12, 2015 (CN) .......................... 2015 1 0493084

(51) Int. Cl.
*G01J 3/40* (2006.01)
*H05B 37/02* (2006.01)
(Continued)

(52) U.S. Cl.
CPC ............ *G01J 3/40* (2013.01); *H05B 33/0869* (2013.01); *H05B 33/0872* (2013.01); *H05B 37/02* (2013.01); *G01M 11/02* (2013.01)

(58) Field of Classification Search
CPC .... G01J 3/02; G01J 3/40; H05B 33/08; H05B 37/02; H05B 41/16; H01L 33/50;
(Continued)

(56) References Cited

U.S. PATENT DOCUMENTS 8,847,972 B2    9/2014   Kane et al.
2008/0013314 A1 1/2008   Ashdown et al.
(Continued)

FOREIGN PATENT DOCUMENTS

CN    101801140 A    8/2010
CN    104053278 A    9/2014
(Continued)

OTHER PUBLICATIONS

International Search Report in PCT/CN2016/080365 dated Jul. 22, 2016, 5 pages.
(Continued)

*Primary Examiner* — Abullahi Nur
(74) *Attorney, Agent, or Firm* — Metis IP LLC

(57) ABSTRACT

The present disclosure relates to a method and related system for spectrum optimization of an illumination light source. Spectrum optimization according to the present disclosure can be based on various optimization parameters, including but not limited to luminous efficacy, color rendering effect, luminous efficacy of radiation, mesopic efficacy of radiation, cirtopic efficacy of radiation, etc. The present method and system are capable of optimizing illumination performance of a light source in various aspects in an individual or integrated manner. Further, the present method and system are capable of accommodating different illumination purposes and conditions by combining and prioritizing different optimization parameters.

20 Claims, 28 Drawing Sheets

(51) Int. Cl.
*H05B 33/08* (2006.01)
*G01M 11/02* (2006.01)

(58) Field of Classification Search
CPC ......... H01J 13/32; H04N 5/225; G03B 15/05; G06F 19/00
See application file for complete search history.

(56) References Cited

U.S. PATENT DOCUMENTS

| | | | |
|---|---|---|---|
| 2008/0046217 A1* | 2/2008 | Polonskiy | G01J 3/28 |
| | | | 702/179 |
| 2011/0254027 A1 | 10/2011 | Harrah et al. | |
| 2012/0326627 A1 | 12/2012 | McDaniel, Jr. | |
| 2014/0055038 A1 | 2/2014 | Cappitelli et al. | |
| 2015/0230316 A1 | 8/2015 | Baaijens et al. | |
| 2015/0250106 A1 | 9/2015 | Wik et al. | |

FOREIGN PATENT DOCUMENTS

| | | |
|---|---|---|
| CN | 104409608 A | 3/2015 |
| CN | 104599636 A | 5/2015 |
| CN | 104979436 A | 10/2015 |
| CN | 105138827 A | 12/2015 |

OTHER PUBLICATIONS

Written Opinion in PCT/CN2016/080365 dated Jul. 22, 2016, 7 pages.

First Office Action in Chinese Application No. 201510241210.4 dated May 27, 2017, 21 pages.

First Office Action in Chinese Application No. 201510493084.1 dated Jun. 2, 2017, 18 pages.

Qi Yao, Analysis of Multi-chips LED's Characteristic and Its Application in Landscape Lighting, China Light & Lighting, 11: 11-14 (2014).

Jing Xu, Spectral Optimization of White Light LED with High Color Rending Index, China Master's Theses Full-text Database, 15-22 (2013).

Qi Yao et al., Effective Reflection Luminance of Object Under Light Source, Laser & Optoelectronics Progress, 52: 5-6 (2015).

Yuan Shi, Research on Luminous Efficacy of Radiation and Scotopic/photopic Ratio of Tri-color White LEDs, Electronics Quality, 12: 2-3 (2013).

Qi Yao et al., Discussion on the Visual and Non-visual Biological Effect of Different Light Sources, Zhaoming Gongcheng Xuebao, 19(2): 2, 2008.

Ning Li et al., Study on Color Temperature Tunable Four-chips White LEDs, Semiconductor Optoelectronics, 36(1): 28-33 (2015).

Qi Yao, Spectral Efficiency Performance Optimization Research on Three-chips of LED, Laser & Optoelectronics Progress, 52: 083003-1-083003-7 (2015).

Arturas Zukaukas et al., Optimization of Solid-state Lamps for Photobiologically Friendly Mesopic Lighting, Applied Optics, 51(35): 8423-8432(2012).

Ji Hye Oh et al., Healthy, Natural, Efficient and Tunable Lighting: Four-package White LEDs for Optimizing the Circadian Effect, Color Quality and Vision Performance, Light: Science & Applications, 3:1-9 (2014).

Qi Yao et al., The Effect of Light Source Color Temperature on Reflected Brightness of Objects, The 21st Cross-Strait Lighting Technology and Marketing, 9-13 (2014).

Peng Jin et al., Luminous Efficacy of White LED in the Mesopic Vision State, Optoelectronics Letters, 5(4): 265-267, 2009.

Neil Holger White Eklund, Multiobjective Visible Spectrum Optimization: a Genetic Algorithm Approach, Dissertation Abstracts International, 2002.

Ziquan Guo, LED Spectral Optimizations and Applications, 2014.

Qi Yao, Application-dependent Spectrum Optimization of Four-package LEDS, Lighting Research & Technology, 48(7): 844-856, 2016.

Qi Yao, Spectral Reflectance Luinous Efficacy, Optik, 126(24): 5790-5796, 2015.

Qi Yao, Ergonomics Research on Application of LED in Civil Cockpit Lighting, Ph. D Dissertation of Fudan University, 2012.

Qi Yao et al., Theoretic Analysis on Effect of Light Sources' Spectrum on Environment in Architecture Landscape Lighting, Journal of Civil, Architectural & Environment Engineer, 36(5): 76-80, 2014.

Houser et al., Review of Measures for Light-source Color Rendition and Considerations for a Two-measure System for Characterizing Color Rendition, Optics Express, 21(8): 10393-10411, 2013.

\* cited by examiner

SYSTEM AND METHOD FOR LIGHT OPTIMIZATION

CROSS REFERENCE TO RELATED APPLICATIONS

This application is U.S. national stage entry under 35 U.S.C. § 371 of International Application No. PCT/CN2016/080365, filed on Apr. 27, 2016, which claims priority to Chinese patent application No. 201510241210.4, filed on May 13, 2015, and Chinese patent application No. 201510493084.1, filed on Aug. 12, 2015, the contents of each of which are hereby incorporated by reference in its entirety.

FIELD OF THE INVENTION

The present disclosure relates to the field of lighting technology and particularly relates to a method and related system for spectrum optimization of an illumination light source.

BACKGROUND OF THE INVENTION

Artificial lighting is an essential element of modern life. How to achieve ideal effects of artificial lighting has been a hot research topic. Many factors are to be considered for optimizing artificial lighting, such as efficiency of energy saving of the lighting solution, safety of an environment under lighting, aesthetics of illuminated objects or scenes, and animal's physiological or psychological reactions to artificial lighting, etc. For example, some studies show that long-term exposure under inappropriate illumination spectra could incur human health problems, such as the seasonal affective disorder. Research on human mesopic vision also suggests that in mesopic vision, spectral responses of human eyes bias towards shorter wavelengths. Thus, a satisfying luminous efficacy under photopic vision conditions may not be sufficient or as satisfactory under mesopic vision conditions.

Traditional evaluation on artificial light sources typically focuses on parameters such as luminous efficacy, color rendering and color temperature. However, as artificial lighting needs in modern life diversify and with advancement in research fields such as mesopic vision and non-visual biological effect, the traditional parameters quickly become insufficient to account for efficiency, comfort, safety, health concerns and various other considerations of artificial lighting. Thus, there exists a need in the field for a new artificial lighting solution capable of solving the above problems.

SUMMARY

This application relates generally to spectrum optimization of an illumination light source. A method and related system disclosed herein can provide a destined light under a working condition based on a merit function.

In one example, a method for providing artificial lighting under a working condition is provided. The method includes determining a destined chromaticity of a destined light; selecting one or more component lights, each component light having a suitable component chromaticity; calculating proportion for each component light based on a merit function, wherein the merit function includes at least one optimization parameter having a first functional correlation with the proportion of at least one component light; and combining the one or more component lights according to the calculated proportion, thereby synthesizing the destined light. In some embodiments, the first functional correlation may be a linear function, an inverse function, an exponential function, a power function or a regular non-linear function. The number of the one or more component lights may be four and the component lights may be monochromatic or polychromatic.

In another example, the proportion of the component lights may assume a second functional correlation with respect to each other. The second functional correlation may be a linear function or a multivariate function. The type of the second correlation function and the first correlation function may be the same, or different.

In a further example, the method includes acquiring information of the working condition. The information may be one or more selected from the group consisting of a reflectance spectrum of a target object, color appearance of a target object under the artificial lighting, a condition of an ambient environment, and a purpose of the artificial lighting. The reflectance spectrum of the target object depends on a spectrum power distribution of the destined light and a spectral reflectance curve of the target object.

In still a further example, the method includes choosing the at least one optimization parameter. The at least one parameter may be selected from the group consisting of luminous efficacy, luminous efficacy of radiation, color rendering index, color temperature, circadian efficacy of radiation, mesopic efficacy of radiation, luminous efficacy in scotopic vision, spectral reflectance luminous efficacy of radiation, photosynthetic photon flux and chromaticity of light reflected by a target subject under the artificial illumination.

In still a further example, a system for providing an artificial lighting under a working condition is provided. The system includes a plurality of light sources, each of which is capable of emitting a component light having a component chromaticity. The system also includes a chromaticity coordinate unit configured to determine a destined chromaticity of a destined light and select one or more component lights of suitable component chromaticity, a calculating unit configured to calculate proportion of each selected component light based on a merit function. The merit function includes at least on optimization parameter having a first functional correlation with the proportion of at least one component light. The system further includes a light source driver configured to combine the one or more component lights according to the calculated proportion, thereby synthesizing the destined light. The calculation unit may be configured to define a second functional correlation between the proportions of the component lights. The system may further include an ambient information obtaining module configured for acquiring working condition information. The working condition information may include a reflectance spectrum of a target object, and the ambient information obtaining module includes one or more sensors configured for detection the reflectance spectrum or a user interface configured for receiving a user input of the working condition information. The working condition information includes luminance, color, temperature, weather, climate or time of an ambient environment. The calculating unit may be configured to define the first functional correlation and the second functional correlation according to the working condition. The chromaticity coordinate unit may be configured to determine the destined chromaticity based on chromaticity of light reflected by a target object under the artificial illumination. At least one of the plurality of light sources may be a LED, a polychromatic LED, a multi-packaged LED, a phosphor-converted LED, a high pressure sodium lamp or a fluorescent lamp. The light source driver may be capable of control a magnitude of current or voltage delivered to each light source, thereby individually controlling an amount of component light emitted by the corresponding light source.

BRIEF DESCRIPTION OF THE DRAWINGS

The present invention will be more readily understood from the detailed description of exemplary embodiments presented below considered in conjunction with the attached drawings, of which.

DETAILED DESCRIPTION OF THE INVENTION

Figure 1:
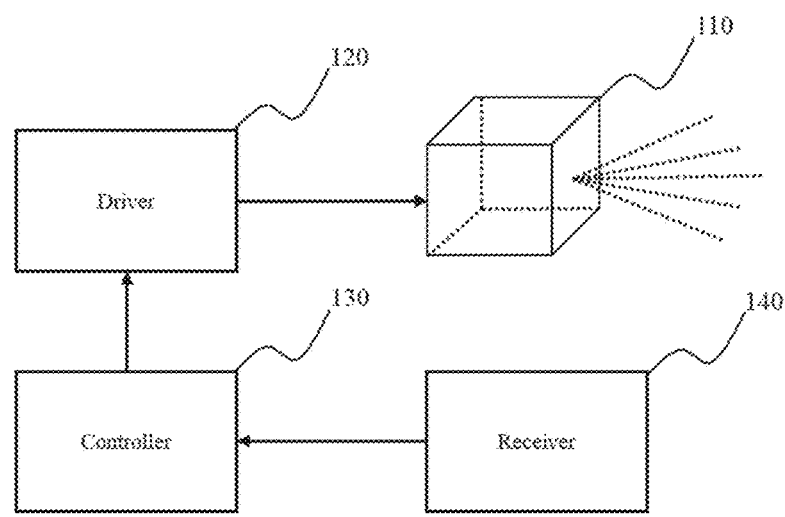
FIG. 1 illustrates an exemplary lighting system capable of spectrum optimization according to some embodiments of the present disclosure.

Provided herein are methods and systems for spectrum optimization of artificial illumination (lighting). Particularly, in some embodiments, the methods and systems disclosed herein are capable of adjusting optical characteristics of the illumination light to accommodate particular needs and/or purposes of the artificial lighting. In some embodiments, the present method and system is capable of automatically recognizing features of an object or environment under illumination. The object is hereinafter referred to as the "target object" or "illuminated object"; and the environment is hereinafter referred to as the "target environment" or "illuminated environment." In some embodiments, when discussing an environment surrounding an illuminated object, the surrounding environment is also referred to as the "ambient environment." In various embodiments, an ambient environment may be illuminated or not illuminated by the artificial lighting.

In some embodiments, the present method and system is configured to optimize the illumination spectrum based on one or more optimization parameters. In various embodiments, the optimization parameters may include but are not limited to luminance, luminous efficacy (LE), luminous efficacy of radiation (LER), spectral reflectance luminous efficacy of radiation (SRLER), reflectance spectrum of illuminated object, color rendering index (CRI), color temperature, chromaticity, mesopic efficacy of radiation, luminous efficacy in scotopic vision, and circadian efficacy of radiation, photosynthetic photon flux (PPF), etc. The reflectance spectrum denotes the reflection of an object under the illumination of a certain light. The certain light may include but not limit to reference light. The reflectance spectrum may be expressed as $P(\lambda)\rho(\lambda)$, wherein $P(\lambda)$ is the spectral power distributions (SPD) of the illumination light, and $\rho(\lambda)$ is the spectral reflectance curve of the illuminated object, $\rho(\lambda)$ is the spectral reflectance curve of the illuminated object, which equals to the ratio between the reflected visible energy and the energy of the illumination light source. Further, various optimization parameters may be selected and determined based on various considerations, including but not limited to energy efficiency, luminous efficacy, color effect, biological or physiological, psychological compatibility, health, purpose and environment of the lighting.

Particularly, energy efficiency is an important parameter for evaluating and providing a lighting solution. As used herein, the term "lighting solution" refers to a method and/or system that provide illumination. Energy efficiency may be mathematically expressed as the luminous efficacy (LE) and luminous efficacy of radiation (LER) of the lighting solution. As used herein, LE is a measurement of how efficient a lighting solution converts a source energy into visible light energy. Thus, the higher value of LE, the more energy efficient the lighting solution is. In some embodiments, the source energy may be in the form of electrical power, chemical energy, biological energy or other suitable forms. Particularly, in some embodiments, LE is defined as the efficiency of energy conversion by an illumination light source, such as the present lighting system disclosed herein.

Due to the spectral sensitivity of human eyes, not all wavelengths of light are equally visible to human, or equally effective at stimulating human vision. For example, radiation in the infrared and ultraviolet parts of the spectrum is useless for illumination, because they cannot be seen by human. As used herein, LER is a measurement of the fraction of electromagnetic radiation that is useful for lighting. In some embodiments, LER may be obtained by dividing the luminous flux by the radiant flux. In some embodiments, light of a wavelength ranging from 380 nm to 780 nm is visible and useful for lighting. Thus, like LE, LER is also parameter for measuring efficiency of a lighting solution.

Spectrum of an illumination light (illumination spectrum) and the spectrum of the light reflected by target objects (reflectance spectrum) are important considerations for evaluating and providing a lighting solution. Particularly, the illumination spectrum of the light and the reflectance spectrum of the target object may together determine the atmosphere created by the illumination. For example, in some embodiments, illumination spectrum and reflectance spectrum may together decide luminance of the lighting solution. Particularly, as used herein, luminance refers to a photometric measure of the density of luminous intensity in a given direction, measured in candela per square meter ($cd/m^2$). Thus, luminance measures how a light source works on an illuminated object. In some embodiments, luminance is mathematically expressed by luminous reflectance Y, which is the product of object's reflectance, the spectral power of a light source, and the luminosity function of the CIE standard observer. Thus, luminance is a measurement relying upon characteristics of both illumination and reflectance. Particularly, if the reflectance spectrum under a lighting system matches the reflectance spectrum of this object under equal-energy white, the lighting solution is likely to produce higher luminance as compared to when the two spectra mismatch. The reflectance spectrum of an object under equal-energy white can be defined as reference reflectance spectrum.

As described above, luminance relates to both the illumination source and the target object's reflectance. While LER may be used to describe efficiency of an illumination light source, it does not directly relate to reflectance property of the object. Thus, LER is not a precise measurement for reflected luminance. That is, from LER alone, one cannot evaluate the illumination efficacy refer to reflectance spectrum, thereby unable to determine whether a satisfactory LER value would lead to also satisfactory luminance of the lighting solution. Accordingly, in some embodiments, another parameter that is similar to LER but also considers target object's reflectance is used for spectrum optimization. As used herein, spectral reflectance luminous efficacy of radiation (SRLER) refers to the ratio between energy reflected by an illuminated object that is visible to human eyes and energy radiated by an illumination source. Thus, the higher SRLER is, the more visible light is reflected by the target object, and thus the higher luminance of the target object. Particularly, in some embodiments, SRLER may be mathematically expressed as:

$$SRLER = \frac{\int_{380}^{780} P(\lambda)V(\lambda)\rho(\lambda)d\lambda}{\int_{380}^{780} P(\lambda)d(\lambda)} = \sum_{380}^{780} P(\lambda)V(\lambda)\rho(\lambda)\Delta\lambda \bigg/ \sum_{380}^{780} P(\lambda)\Delta\lambda \quad (1)$$

where $P(\lambda)$ is the SPD of the illumination light, $V(\lambda)$ is the standard luminosity function, $\rho(\lambda)$ is the spectral reflectance curve of the illuminated object, which equals to the ratio between the reflected visible energy and the energy of the illumination light source. The spectral reflectance curve herein denotes the reflection curve of an object under the illumination of reference light.

In some embodiments, illumination spectrum and reflectance spectrum may together decide also the color appearance of the illuminated object. Particularly, color appearance of an illuminated object or environment to an observer may be mathematically expressed as the chromaticity of the reflected light. In some embodiments, color effect of an illumination solution may be also expressed as the color temperature or color rendering index (CRI). Color temperature is conventionally expressed in Kelvin, using the symbol K, a unit of measure for temperature based on the Kelvin scale. Typically, color temperatures over 5,000K are referred to as cool colors (bluish white), while lower color temperatures (2,700 to 3,000 K) are referred to as warm colors (yellowish white through red). Chromaticity is an objective specification of the quality of a color regardless of its luminance. In some embodiments, chromaticity of a light corresponds to a chromaticity coordinate (x, y) on a standard chromaticity diagram, such as the 1931 CIE chromaticity diagram. As used herein, CRI is a quantitative measurement of the ability of an illumination light source to reveal colors of an illuminated object faithfully in comparison with an ideal or natural light source.

Additionally, human psychological, biological or physiological reactions to artificial lights are also important considerations in providing a lighting solution. For example, spectral sensitivity of human visual perception changes with ambient luminance under a mesopic vision condition. Particularly, photopic efficacy refers to the average spectral sensitivity of human visual perception of brightness. In some embodiments, photopic efficacy may be expressed as a ratio of luminous flux for photopic vision to the total luminous flux radiated by an illumination light source.

However, spectral sensitivity of human eyes is different from photopic vision in a dark environment. Spectral sensitivity of human eyes may be more precisely measured as mesopic efficacy in a mesopic vision environment, which may occur when luminance ranges approximately from 0.005 to 5 $cd/m^2$, and as scotopic efficacy in a scotopic vision environment, which may occur when ambient luminance is below 0.005 $cd/m^2$. Thus, under mesopic or scotopic vision conditions, illumination effects may be perceived differently from those calculated under standard (photopic) conditions. Accordingly, in some embodiments illumination spectrum may be optimized to account for the mesopic vision effect. For example, in mesopic vision, spectral responses of human eyes bias towards shorter wavelengths, thus in an mesopic environment, such as a highway tunnel, illumination using short wavelength lights may be more efficient in stimulating drivers' vision response and thus keeping them alert.

Additionally, spectral response of human visual perception also changes with non-visual physiology of a human body, herein referred to as non-visual biological effect. For example, in some embodiments, spectral response of human visual perception may change with the circadian rhythms of a human body. In other embodiments, human visual perception may in turn affect the circadian rhythms. For example, blue light may suppress production of the hormone melatonin, leading to increases in alertness at night and reduction in sleep time and quality. In some embodiments, the parameter circadian efficacy of radiation (CER) may be used to measure cirtopic effect of illumination.

Further, purpose and environment of illumination are important considerations in providing a lighting solution. For example, illumination light matching the illuminated environment improves aesthetic effect of the lighting. For another example, landscape lighting has its own characteristics. Some landscape, like architecture and sculptures, are color saturated and some are not. While landscape such as a dense vegetation area is likely color saturated, typically landscape has fewer color types. Thus, for landscape lighting, luminance or color of the light source is less important than luminance or color reflected by the illuminated environment. For another example, smart lighting, such as mood lighting, provides adjustable lighting atmosphere according to human's behavior or mood change. For another example, in functional lighting, such as for a reading lamp, sufficient luminance and color contrast tend to make reading comfortable and healthy to human eyes. For yet another example, in agricultural lighting, photosynthetic photon flux (PPF) of a light source may be considered. As used herein, the term "photosynthetic photon flux" or "PPF" refers to the ratio of flux for photosynthesis to the number of absorbed photon, thus reflects the efficiency of the artificial light solution in stimulating plant growth.

According to the present disclosure, spectrum optimization may be based on one or more optimization parameters. Further, multiple parameters may be optimized individually or concurrently. In some embodiment, values of the one or more optimization parameters may be pre-determined. In other embodiments, values of the one or more optimization parameters may be determined during the spectrum optimization process.

In some embodiments, the present methods and systems optimize the spectrum of an illumination light source by mixing multiple component lights having desirable characteristics, thereby outputting a destined light with a spectrum optimized according to one or more optimization parameters. As used herein, the term "component light" refers to one or more of the lights that are to be mixed together, and the term "destined light" refers to the light output that has the optimized spectrum. According to the present disclosure, the component light may be monochromatic or polychromatic. In some embodiment, a component light may be produced by a LED, such as but not limited to a polychromatic LED, multi-chip LED, PC LED, a high pressure sodium lamp (HPS), fluorescent lamp (FL), or other optical devices capable of emitting a single wavelength light or light having a narrow range of spectral power distribution (SPD), such as a peak width at half height of smaller than 30 nm.

The present systems and methods may find their applications in various fields, including but not limited to multi-packaged LEDs, a phosphor-converted LED (PC LED), high pressure sodium lamp (EPS), fluorescent lamp (FL), or the like, or a combination thereof.

The following paragraphs will describe the present method and system more fully hereinafter with reference to the accompanying drawings in order to provide a thorough understanding of the relevant disclosure, in which preferred embodiments of the invention are shown. Various modifications to the disclosed embodiments will be readily apparent to those skilled in the art, and the general principles defined herein may be applied to other embodiments and applications without departing from the spirit and scope of the present disclosure. Thus, the invention may be embodied in many different forms and should not be construed as limited to the embodiments set forth herein; but to be accorded the widest scope consistent with the claims.

In one aspect of the present disclosure, provided herein is a system for spectrum optimization. As used herein, the term "system," "device", "module", and/or "unit" are one method to distinguish different components, elements, parts, section or assembly of different level in descending order. However, the terms may be displaced by other expression if they may achieve the same purpose.

FIG. 1 illustrates an exemplary lighting system capable of spectrum optimization according to some embodiments of the present disclosure. As shown in the figure, the lighting system 100 may include a light emitting device 110, a driver 120, a controller 130 and a receiver 140. The light emitting device 110 may include a single light source, or a set of multiple light sources. Light emitted by the emitting device may be monochromatic having a single wavelength or a narrow SPD with a single peak, or may be polychromatic having a mixture of different wavelengths. In some embodiments, the light sources produce component lights that are to be mixed to produce a destined light having an optimized spectrum.

The driver 120 may be configured to drive the component light sources in the light emitting device 110. In some embodiments, the driver 120 may change the composition of the destined light by adjusting the proportion of a component light.

The controller 130 may control the function of the driver 120. In some embodiments, the controller 130 may include a processor that is configured to execute instructions for spectrum optimization in the system 100. In some embodiments, the instructions may depend on information acquired by the receiver 140. The receiver 140 may be configured to acquire different types of information to determine light emission of the system 100. Exemplary types of information may include optical characteristics of a target object and/or conditions of an ambient environment acquired by a detector (not shown in FIG. 1), data transmitted from a local storage device or a remote server, or a manual input by a user, or the like, or a combination thereof. In some embodiments, the ambient condition may relate to a target object, brightness of surrounding environment, temperate of environment, a user's preference, or the like, or a combination thereof. The data transmitted from local storage device or a remote server may include a schedule relating to the working condition of the light emitting device 110, an instruction relating to the operation of the light emitting device 110, or the like, or a combination thereof. Manual input by a user may be performed through a user input interface, such as a wireless or wire-connected keyboard, a touchscreen with virtual buttons for communicating commands and other input information to the lighting system 100.

Figure 2:
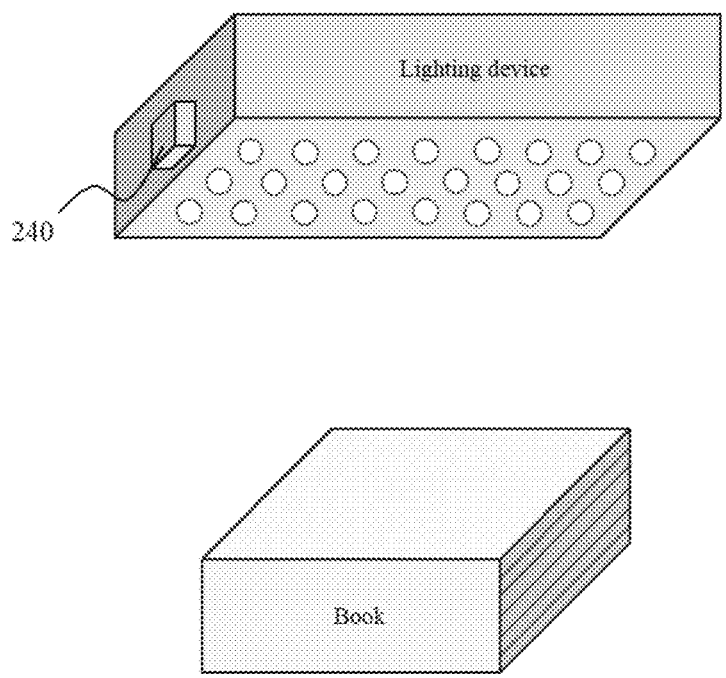
FIG. 2 depicts an exemplary working condition of the lighting system according to some embodiments of the present disclosure.

FIG. 2 depicts an exemplary working condition of the lighting system according to some embodiments of the present disclosure. The working condition 200 relates to adjusting the illumination spectrum for a user's reading of a book, such that the user's eyesight is protected. In this example, the lighting system includes multiple component light sources for providing illumination on a target object (e.g., a book in this example). In some embodiments, the illumination light is monochromatic. In other embodiments, the illumination light may be polychromatic having RGBA colors or multi-colors of other kinds. In some embodiments, the illumination light is produced by mixing multiple component lights together.

Additionally, the lighting system may include a detector 240 configured to sense conditions of a target object, such as its color, shape and/or reflectance spectrum. In various embodiments, the detector 240 may be arranged as a unit separated from the light sources. A controller (not shown in FIG. 2) may be configured to optimize illumination spectrum of the lighting system to comfort human eyes, based on the information acquired by the detector, such as the book's reflectance spectrum. Specifically, in the spectrum optimization process, one or more parameters of the illumination light may be optimized, such as chromaticity, color rendering effect, luminous efficacy, reflected efficiency, circadian effect, etc. The optimization parameters may be determined during the optimization process, based on information acquired by the detector, or pre-determined or input by a user. Further details regarding the optimization parameters will be discussed below.

Figure 3:
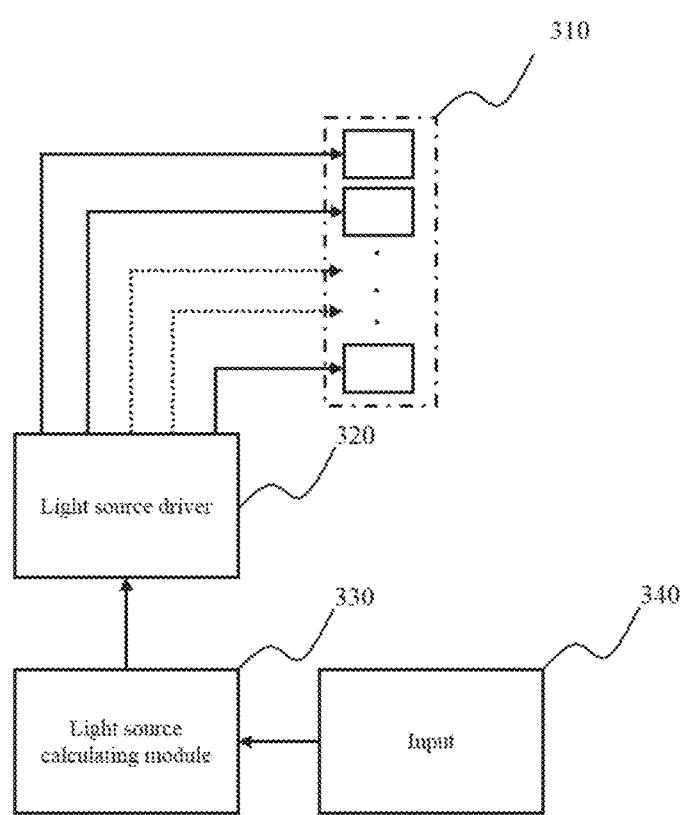
FIG. 3 is a block diagram illustrating an exemplary spectrum optimization system according to some embodiments of the present disclosure.

FIG. 3 is a block diagram illustrating an exemplary spectrum optimization system 300 according to some embodiments of the present disclosure. For better illustration, the spectrum optimization system is described with the example of a lighting system having an adjustable illumination spectrum. As shown in FIG. 3, the lighting system 300 may include a light emitting device 310, a light source driver 320, a light sources calculating module 330, and an input 340. In some embodiments, the light emitting device 310 may include multiple light sources that may be monochromatic or polychromatic. In some embodiments, a component light source may produce a monochromatic light having a single wavelength or a narrow SPD with a single peak. In other embodiments, a component light source may produce a polychromatic light having multiple different peaks in its SPD. In some embodiments, a component light source may be any type of light source capable of emitting single wavelength light or light with a narrow SPD with a single peak, such as a LED, high pressure sodium lamp (HPS), fluorescent lamp (FL), or the like, or any combination thereof. Of different kinds of light sources, multi-package LEDs are flexible in spectral composition, and spectrum proportions of each LED are easy to control. For example, in some embodiments, by choosing different chips, a variety of LEDs with different spectra could be obtained.

In some embodiments, chromaticity of each light source corresponds to a specific chromaticity coordinate on a chromaticity diagram, which in turn corresponds to a specific color presented on the chromaticity diagram. Further details of chromaticity coordinates will be discussed in relation to FIG. 4B.

For example, in some embodiments, the light emitting device 310 comprises four component light sources (e.g., four LEDs). As described above, each component light source may emit light having a specific color. For example, in some embodiments, the four colors may be red, amber, green and blue. In various embodiments, any colors presented on the chromaticity diagram may be used. A polychromatic destined light having desirable optical characteristics may be produced by mixing the component lights according to certain proportions. In some embodiments, proportions of the component lights may correlate with each other. Particularly, in some embodiments, proportion of one component light may assume a linear relationship with proportion of another component light. It shall be noted that the above description of the light emitting device is provided for illustration purpose, and is not intended to limit the scope of the present disclosure. For persons having ordinary skills in the art, various variations and modifications may be conducted under the teaching of the present disclosure. For example, the light emitting device 310 may have any number of component light sources, each light source may produce a component light of any color, and a component light may be a monochromatic or polychromatic light.

The light source driver 320 may drive the light sources by delivering to them voltage or current at calculated levels. The light source driver 320 may receive a command from the light source calculating module 330, and adjust driving voltage or current for individual light sources accordingly. The light source calculating module 330 may be configured to select and determine parameters for spectrum optimization based on information received from the input 340. For example, the light source calculating module 330 may calculate respective proportions of multiple component lights to be combined to generate a destined light having a desirable synthesized chromaticity. In some embodiments, the input 340 may provide the light source calculating module 330 information regarding a working condition of the lighting emitting device 310. As used herein, the term "working condition" broadly relates to any condition or circumstance under which a lighting solution operates, which includes but are not limited to the purpose or goal of the lighting, the target object or environment to be illuminated, the requirement or input by a system default or a user, etc. In some embodiments, information regarding the working condition relates to conditions of an ambient environment of a target object and may be acquired by a detector, transmitted from a local storage device or a remote server, or manually input by a user, or the like, or a combination thereof.

In some embodiments, the light source calculating module 330 calculates respective proportions of component lights based on the component chromaticity and the destined chromaticity. As used herein, the term "component chromaticity" refers to the chromaticity of a component light, and the term "destined chromaticity" or "synthesized chromaticity" refers to the chromaticity of the destined light. In some embodiments, the input 340 decides the component and destined chromaticity and transmits the values to the light source calculating module 330.

Figure 4A:
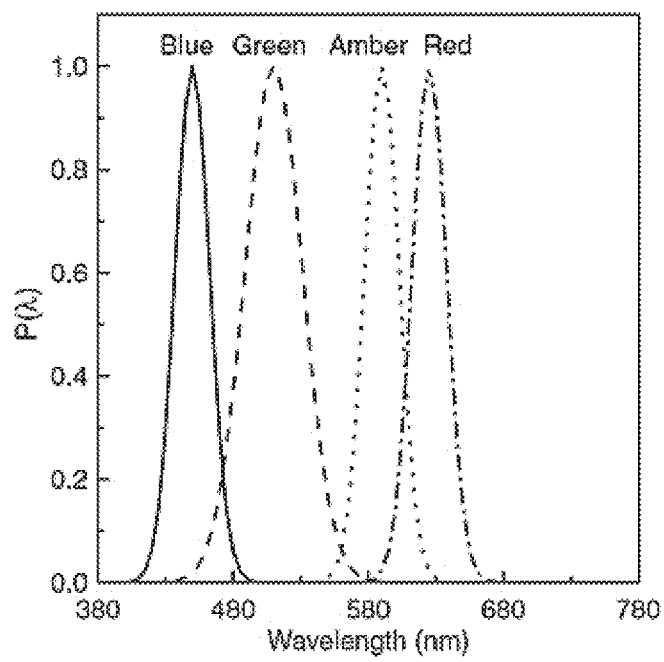
FIG. 4A shows the spectral power distributions (SPD) of the component lights according to some embodiments of the present disclosure.

Below is an example to illustrate the calculating process. Four LEDs are selected to produce component lights of red, amber, green and blue colors, respectively. FIG. 4A shows the spectral power distributions (SPD) of the component lights. Particularly, FIG. 4A shows the normalized SPD of the four LEDs with red, amber, green and blue for color mixture and spectrum optimization. The abscissa represents the wavelength, and the ordinate P (λ) represents the SPD. As shown in the figure, each LED has a narrow range of spectral power distribution and a central maximum. For example, the LED generating blue light may have a spectrum centralized at 450 nm.

Figure 4B:
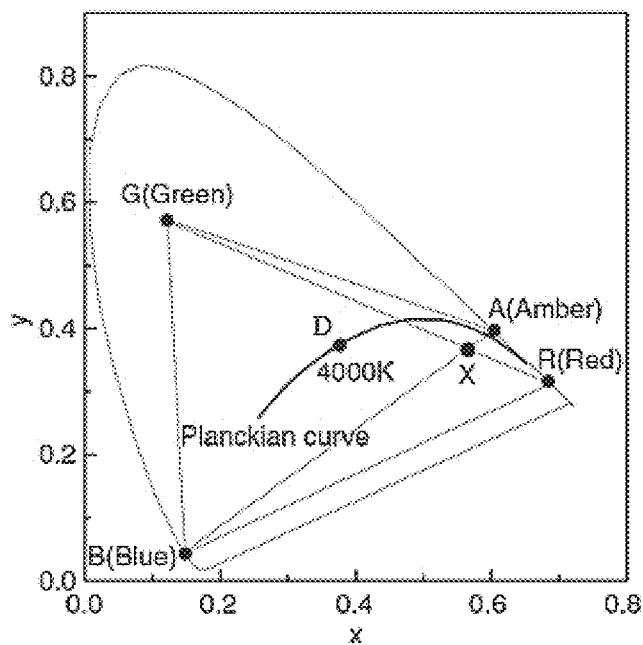
FIG. 4B shows the chromaticity coordinates of the corresponding colors according to some embodiments of the disclosure.

As described above, each color corresponds to a chromaticity coordinate (x, y) on the 1931 CIE chromaticity diagram. Thus, FIG. 4B shows the chromaticity coordinates of the corresponding colors according to some embodiments of the disclosure. As shown in FIG. 4B, points R, A, G and B correspond to the chromaticity coordinates of colors in red, amber, green and blue, respectively. Point X is the intersection point of points R, A, G and B.

In this example, the destined light is set to have a chromaticity corresponding to point D on the chromaticity diagram. The destined light is also set to have a desirable color temperature of 4000K. See the figure showing point D sitting on the Planckian curve representing blackbody radiation of 4000K. If point D falls within an area surrounded by the selected component chromaticity coordinates, the destined light can be synthesized by mixing some or all of the selected component lights.

Particularly in this example, the destined chromaticity D locates within triangle XGB. Accordingly, the destined light may be generated by combining the three of green, amber and blue lights, or by combining the three of green, red and blue lights, or by combining the four of green, amber, red and blue lights. Alternatively, the destined light may be generated by combining all four of green, red, blue and amber lights. Thus, component light sources may be selected. In various embodiments, the number of component lights can be any number, including 1, 2, 3, 4 or greater than 4 component lights.

After deciding the component lights, their respective proportions for generating the destined light can be calculated by the color mixture function as writing in equation (2) below. Further details regarding spectrum optimization using the color mixture function will be discussed in relation to FIGS. 6 through 8.

In some embodiments, connection between different modules or units may be in a wired or wireless fashion. The wired connection may include using a metal cable, an optical cable, a hybrid cable, an interface, or the like, or any combination thereof. The wireless connection may include using a Local Area Network (LAN), a Wide Area Network (WAN), a Bluetooth, a ZigBee, a Near Field Communication (NFC), or the like, or any combination thereof.

It should be noted that the above description about the lighting system is merely an example, and should not be understood as the only embodiment. Obviously, to those skilled in the art, after understanding the basic principles of the connection between different modules or units, the modules or units and connection thereof may be modified or varied without departing from the principles. The modifications and variations are still within the scope of the current disclosure. In some embodiments, these modules or units may be independent. In some embodiments, part of the modules or units may be integrated into a single module or unit to work together.

Figure 5:
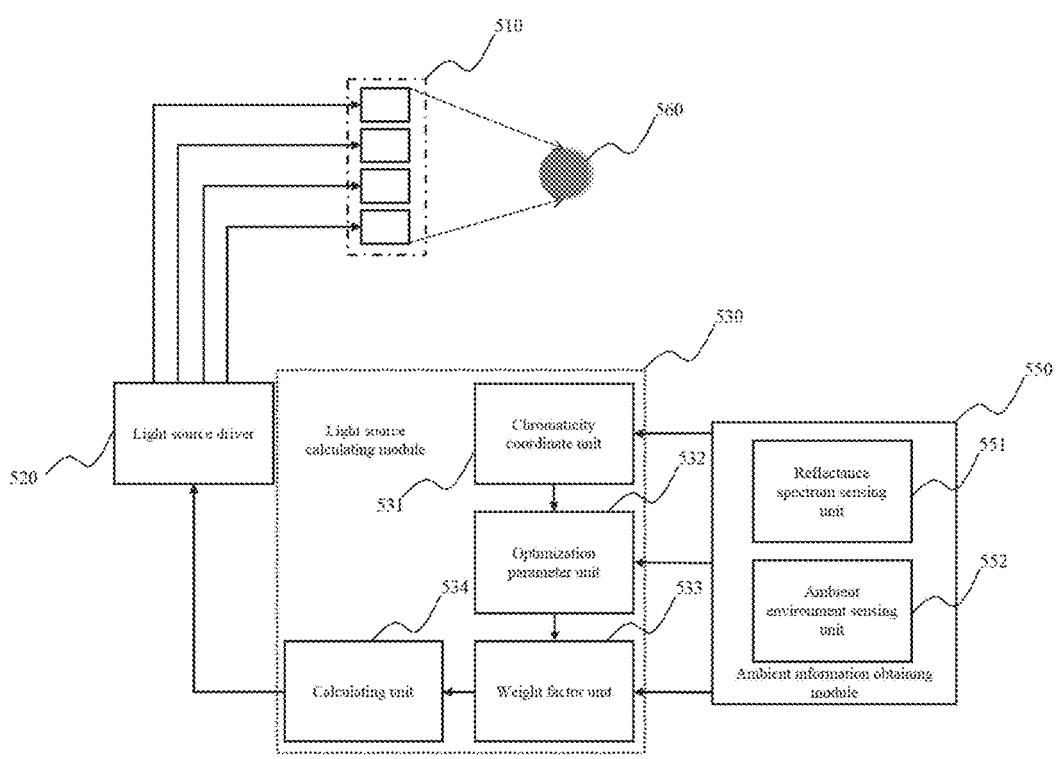
FIG. 5 illustrates a block diagram of a lighting system according to some embodiments of the present disclosure.

FIG. 5 illustrates a block diagram of a lighting system 500 according to some embodiments of the present disclosure. The lighting system 500 may include a light emitting device 510, a light source driver 520, a light source calculating module 530 and an ambient information obtaining module 550. The light source calculating module 530 may include a chromaticity unit 531, an optimization parameter unit 532, a weight factor unit 533 and a calculating unit 534. The ambient information obtaining module 550 may include a reflectance spectrum sensing unit 551 and an ambient environment sensing unit 552. Under the control of the light source driver 520, the light emitting device 510 generates illumination light to illuminate on a target object 560. In some embodiments, the illumination light may be a monochromatic light. In some embodiments, the illumination light may be a polychromatic light.

In some embodiments, the ambient information obtaining module 550 may be configured to acquire and analyze the reflectance spectrum of the target object under illumination. In some embodiments, the reflectance spectrum sensing unit 551 may analyze SPD of the reflected light. Reflectance spectrum of the target object may reflect certain optical characteristics of the object. For example, a valley in the SPD at a particular wavelength may indicate strong absorption of that wavelength by the object. Similarly, a peak in the SPD at a particular wavelength may indicate strong reflection of that wavelength by the object. Also, the reflectance spectrum affects color appearance of the target object under illumination. Thus, acquired reflectance information may be used to set or optimize illumination spectrum of the light emitting device 510.

For example, illumination condition may affect plant growth. Illumination spectrum matching a plant's absorbing spectrum is more efficient to stimulate plant growth and illumination spectrum matching a plant's reflectance spectrum may be used to prevent overgrowth of the plant. Thus, according to different needs, the lighting system may choose to combine component lights having a desirable wavelength to synthetize the destined light. As another example, spectrum of landscape lighting may be designed or optimized to match reflectance spectrum of the landscape in a natural environment (e.g., under sunlight). Particularly, providing illumination spectrum matching the landscape's natural reflectance spectrum may make the artificially illuminated landscape appear real and vivid. Specifically, for a vegetation area that strongly reflects green light under the sun, increasing green light component in an artificial illumination spectrum may help to achieve a desirable lighting effect.

Besides the target object's optical characteristics, the ambient information obtaining module 550 may be further configured to acquire and analyze conditions of the target object's ambient environment. In some embodiments, the ambient environment sensing unit 552 may collect environmental information, such as temperature, time, humidity, weather, or the like, or a combination thereof.

In some embodiments, during a spectrum optimization process, the destined chromaticity coordinate unit 531 of the system may determine the destined chromaticity of the destined light according to the ambient environment. For example, chromaticity for daytime illumination may correspond to a higher color temperature, and chromaticity for night time illumination may correspond to a lower color temperature. In some embodiments, the destined chromaticity coordinate unit 531 of the system may determine an acceptable range of the destined chromaticity.

In some embodiments, the chromaticity unit 531 may further select one or more component light sources for synthesizing the destined chromaticity, the component light sources each produce light of a particular chromaticity. In some embodiments, the component light sources are monochromatic, each producing a component light having a single wavelength or a narrow SPD with a single peak. In other embodiments, the component light sources are polychromatic, each producing a component light having multiple peaks in the SPD. In yet other embodiments, some component light sources are monochromatic while other component light sources are polychromatic.

The optimization parameter unit 532 may determine one or more parameters for optimizing the illumination spectrum of the light emitting device 510. Exemplary parameters may include luminous efficacy (LE), color rendering index (CRI) and luminous efficacy of radiation (LER), photopic efficacy, mesopic efficacy, circadian efficacy of radiation (CER) for non-visual biological effects, the spectral reflectance luminous efficacy of radiation (SRLER), photosynthetic photon flux (PPF) or a combination thereof.

The weight factor unit 533 may be configured to operate in connection with the optimization parameter unit 532. Particularly, different weight factors may be given to different optimization parameters. In some embodiments, optimization parameters and their respective weight factors may be determined based on the working condition under which the lighting system is used. Merely by way of example, luminous efficacy may be considered for lighting in an environment where brightness and visibility are important, such as roads, highway tunnels, manufacturing plants, offices, classrooms, etc. Circadian efficacy may be considered for lighting in a human-populated environment, such as bedrooms, hospital wards, offices, and classrooms, etc. Spectral reflectance luminous efficacy of radiation may be considered for lighting in an environment where colored objects need to be illuminated, such as retail lighting, museum lighting, landscape lighting, etc. Color rending may be considered for lighting in an environment where discerning colorful representations is important, such as a painting room, a museum, a shopping mall etc. Mesopic efficacy may be considered for lighting in an environment of which the luminance condition may trigger mesopic vision of the human eye, such as highway tunnels and certain outdoor environment. Furthermore, multiple parameters chosen for the optimization may be given different weight factors before composition of the destined light is calculated. Also, Table 1 below provides several examples for how multiple optimization parameters may be considered under different working condition.

TABLE 1

Exemplary requirements of optimization parameters for different circumstances

| Circumstance | Parameter | | | | |
|---|---|---|---|---|---|
| | LE | CRI | Mesopic efficacy Requirement | Circadian efficacy | SRLER |
| Classroom | high | high | very low | fair | very low |
| Office | high | high | very low | fair | very low |
| Bedroom | fair | high | very low | high | very low |
| Shopping mall | fair | very high | very low | very low | very high |
| Museum | fair | very high | very low | very low | very high |
| Manufacturing plant | high | fair | very low | high | very low |
| Highway tunnel/Road | very high | low | high | high | very low |
| Landscape | fair | fair | very low | very low | very high |
| General outdoor | high | fair | high | fair | very low |

The calculating unit 534 may be configured to calculate respective proportions of component lights to be combined according to the optimization parameters and weight factors. Further details regarding the calculation are provided below in relation to FIGS. 6 to 8. The light source driver 520 may provide driving current and/or voltage to the respective component light sources according to the calculation result, such that the light emitting device 510 produces the destined illumination light having optimized spectrum.

Figure 6:
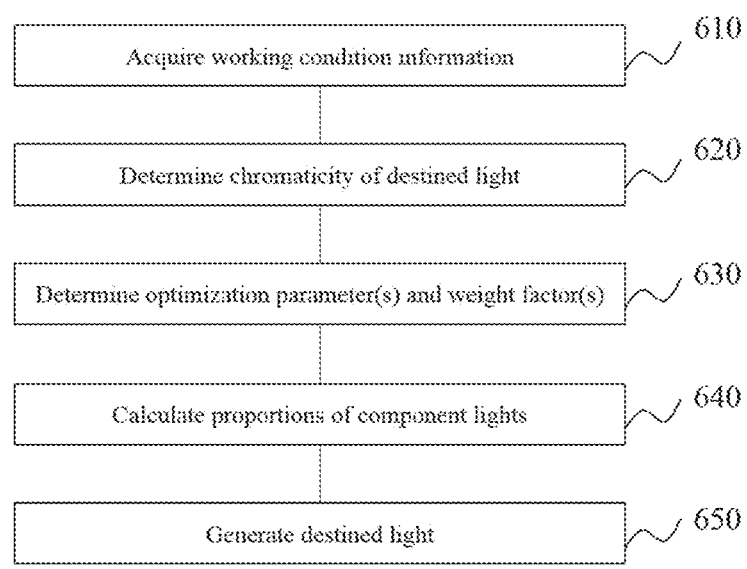
FIG. 6 is a flowchart illustrating a process for spectrum optimization according to some embodiments of the present disclosure.

FIG. 6 is a flowchart illustrating a process 600 for spectrum optimization according to some embodiments of the present disclosure.

In step 610, information of the working condition may be acquired. For example, in some embodiments, information regarding one or more target objects and the ambient environment may be acquired. As described elsewhere in the disclosure, information regarding the target object may include optical characteristics of the object, such as its color appearance, shape or reflectance spectrum. Information regarding the ambient environment may include features such as brightness, dominant color, size, temperature, and weather of the environment, or the like, or a combination thereof. In some embodiments, information regarding the working condition may be acquired by the lighting system 500 through a sensor. In some embodiments, the sensor may be integrated in the ambient information obtaining module 550 as shown in FIG. 5. In various embodiments, information regarding the working condition may be input into the lighting system 500 by a user or pre-stored in and retrieved from a memory of the lighting system 500. For example, in some embodiments, a user may set the lighting system 500 to work for a particular working condition. In some embodiments, the lighting system 500 may have various pre-set modes suitable for working under particular conditions. For example, in some embodiments, the lighting system 500 may have a sleep mode, a daytime mode, an energy efficient mode, and a bright mode, etc. In some embodiments, the lighting system 500 may optimize the illumination spectrum to accommodate circadian effects of the human body. In some embodiments, the lighting system 500 may optimize the illumination spectrum according to user's customized request. For example, if the user sets the lighting system 500 to the energy efficient mode, the lighting system 500 may change the optimization parameters to achieve the highest power efficiency. Specifically, the optimization parameter unit 532 may increase the LE setting to achieve the energy-saving goal. As another example, if the user sets the lighting system 500 to the bright mode, the lighting system 500 may change the optimization parameters to achieve the best luminous efficacy.

In step 620, chromaticity of the illumination light may be determined. In some embodiments, the chromaticity may be determined by the chromaticity unit 531 as described in relation to FIG. 5. In some embodiments, the chromaticity may be determined according to the working condition information as received in step 610. Alternatively, in other embodiments, the chromaticity may be input by a user or pre-stored in the lighting system. For example, a commonly predetermined chromaticity of illumination light is white.

For illustrative purpose, an example of combining four component lights of particular chromaticity coordinates to generate destined illumination light of desirable chromaticity is provided below. According to the color mixture function, the relationship between the chromaticity coordinates of the component lights and that of the produced polychromatic light can be expressed as:

$$\begin{cases} (a_1l_1 + a_2l_2 + a_3l_3 + a_4l_4)x = a_1l_1x_1 + a_2l_2x_2 + a_3l_3x_3 + a_4l_4x_4 \\ (a_1l_1 + a_2l_2 + a_3l_3 + a_4l_4)y = a_1l_1y_1 + a_2l_2y_2 + a_3l_3y_3 + a_4l_4y_4 \\ a_1 + a_2 + a_3 + a_4 = 1 \end{cases} \quad (2)$$

where, $x_1$, $y_1$; $x_2$, $y_2$; $x_3$, $y_3$; $x_4$, $y_4$ are the chromaticity coordinates of the component lights; x, y is the chromaticity coordinate of the destined light; $a_1$, $a_2$, $a_3$, $a_4$ are the proportions of the component lights; $l_1$, $l_2$, $l_3$, $l_4$ are the sum of tri-stimulus values of the component lights. As used herein, the tri-stimulus value refers to the amount of the three primary colors in a tri-chromatic additive color model, such as in the 1931 CIE XYZ color space. Equation (2) is to be solved for unknown factors $a_1$, $a_2$, $a_3$ and $a_4$.

According to the present disclosure, component lights having any chromaticity coordinates may be used in connection with the present method or system. In some embodiments, proportions of the component lights may correlate with each other. For illustration purpose, suppose $a_1$=t, according to equation (3), $a_i$ may linearly relate to t.

$$a_i = k_i t + b_i \quad (3)$$

where $k_i$ denotes the slope of proportion corresponding to the $i^{th}$ component light with respect to t, $b_i$ is a constant corresponding to the $i^{th}$ component light. Since the chromaticity coordinates of component lights and destined light may be predetermined, $k_i$ and $b_i$ may be calculated in equation (2). Also, the range of t is limited since $a_i$ ranges from 0 to 1.

As shown, in the case where four component lights are used, equation (2) is an underdetermined equation and may have indefinite number of solutions for $a_1$, $a_2$, $a_3$ and $a_4$. Thus, to reach a definite solution, one or more optimization parameter may be taken into consideration.

In step 630, one or more optimization parameters may be determined by, for example, the optimization parameter unit 532 as shown in FIG. 5. Since the lighting solution is provided for particular working conditions, the parameter(s) may be optimized accordingly.

As described elsewhere in the disclosure, the optimization parameters may include but are not limited to color rendering index (CRI), luminous efficacy (LE), luminous efficacy of radiation (LER), mesopic efficacy, efficacy for circadian effects and spectral reflectance luminous efficacy of radiation. The optimization parameters may represent different qualities of the lighting solution. In some embodiments, the optimization parameters may correspond to the proportion of a component light (e.g., "t" in equation (3)). Light optimization may be based on one or more parameters. For example, luminous efficacy may be considered for lighting in an environment where brightness and visibility are important, such as roads, highway tunnels, manufacturing plants, offices, classrooms, etc. Circadian efficacy may be considered for lighting in a human-populated environment, such as bedrooms, hospital wards, offices, and classrooms, etc. Spectral reflectance luminous efficacy may be considered for lighting in an environment where colored objects need to be illuminated, such as retail lighting, museum lighting, landscape lighting, etc. Color rendering effect may be considered for lighting in an environment where discerning colorful representations is important, such as a painting room, a museum, a shopping mall etc. Mesopic efficacy may be considered for lighting in an environment of which the luminance condition may trigger mesopic vision of the human eye, such as highway tunnels and certain outdoor environment. Furthermore, multiple parameters chosen for the optimization may be given different weight factors before composition of the destined light is calculated. See also Table 1 above.

In step 640, proportions of component lights may be calculated. In some embodiments, the proportions may be calculated by the calculating unit 534 as shown in FIG. 5. After determining the optimization parameters in step 630, the optimization process may be performed according to the selected optimization parameters and weight factors.

In step 650, the driver unit 520 may drive the component light sources according to the proportions determined in step 640.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. In one example, the sequential order of steps in the flowchart may be adjusted, such that the determination of the weight factors of the optimization parameters may be conducted before acquiring information regarding the working condition or determining the chromaticity of the destined light. In another example, the step for acquiring of the working condition information may be not necessary, as the chromaticity and wavelength composition of the destined light may be predetermined by a system default, or input by a user.

Figure 7:
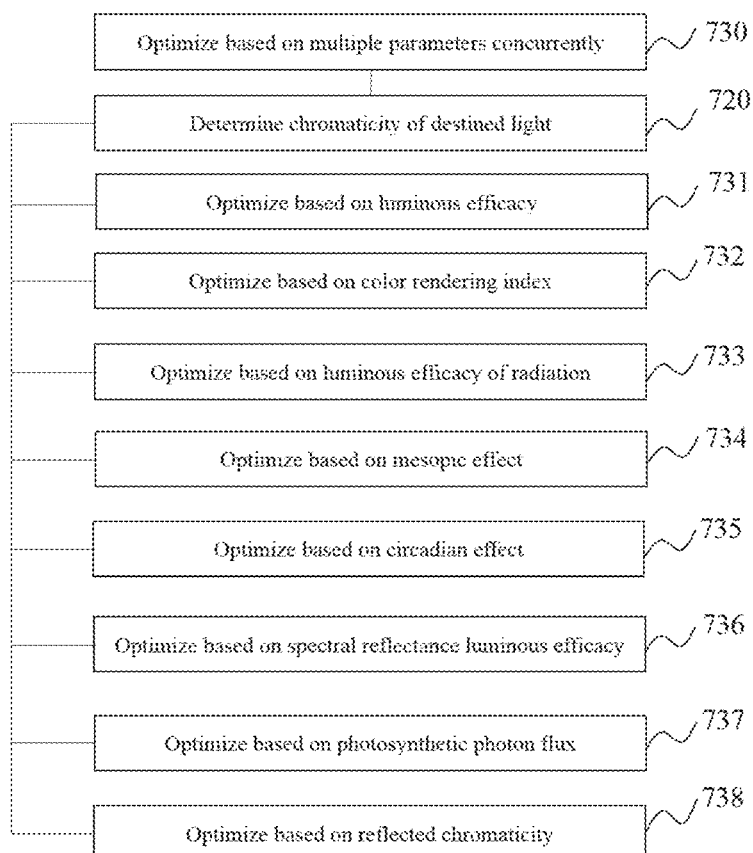
FIG. 7 is a flowchart illustrating the process for determining optimization parameters and optimizing illumination spectrum according to some embodiments of the present disclosure.

FIG. 7 is a flowchart illustrating an exemplary process for optimizing illumination spectrum based various parameters according to some embodiments of the present disclosure. In step 720, a destined chromaticity and one or more optimization parameters may be selected, such as by the optimization parameter unit 532 as shown in FIG. 5. In some embodiments, one or more of the optimization parameters may relate to the proportion of a component light (t). Particularly, the one or more optimization parameters may have a certain functional relationship with t, such as a linear function, an inverse function, an exponential function, a logarithmic function, a power function and other regular non-linear function relationship.

In step 731, the illumination spectrum destined light may be optimized according to the parameter of luminous efficacy (LE). In some embodiments, LE of the lighting solution may relate to t. Merely by way of example, in some embodiments, LE may be expressed as a monotonic increasing/decreasing function of t.

$$\eta = \Sigma_{i=1}^{4} (k_i t + b_i) \eta_i \quad (4)$$

where $\eta_i$ represents the $i^{th}$ component light's LE that relates to the SPD of $i^{th}$ component light and the photopic spectral sensitivity curve, $k_i$, $b_i$ are constants corresponding to the proportion of $i^{th}$ component light (e.g., t).

In step 732, the illumination spectrum destined light may be optimized according to the parameter of color rendering index (CRI). In some embodiments, CRI of the lighting solution may relate to t. For example, in some embodiments, the CRI may be expressed as a reverse function of t.

In step 733, the illumination spectrum destined light may be optimized according to the parameter of luminous efficacy of radiation (LER). LER may also be an inverse function expressed by the proportion of a light source (e.g., t). For example, in human visible range, LER may be expressed as:

$$LER = \int_{380}^{780} P(\lambda)V(\lambda)d\lambda \bigg/ \int_{380}^{780} P(\lambda)d\lambda = \quad (5)$$

$$t\int_{380}^{780}(k_1P_1+k_2P_2+k_3P_3+k_4P_4)V(\lambda)d\lambda +$$
$$\frac{\int_{380}^{780}(b_1P_1+b_2P_2+b_3P_3+b_4P_4)V(\lambda)d\lambda}{t\int_{380}^{780}(k_1P_1+k_2P_2+k_3P_3+k_4P_4)d\lambda +}$$
$$\int_{380}^{780}(b_1P_1+b_2P_2+b_3P_3+b_4P_4)d\lambda$$

where $P(\lambda)$ is the SPD of the destined light, $P_1$, $P_2$, $P_3$, $P_4$ are the corresponding SPD of the component light. $V(\lambda)$ is the photopic spectral sensitivity curve, $\lambda$ is the wavelength, $k_i$, $b_i$ are constants corresponding to the proportion of $i^{th}$ component light source (e.g., t).

In step 734, the illumination spectrum destined light may be optimized according to the parameter of mesopic efficacy. In some embodiments, S/P ratio or M/P ratio may be used to evaluate whether a light source has a high mesopic efficacy. Particularly, as used herein, the S/P ratio represents the ratio between scotopic luminous flux and photopic luminous flux, and may be used to describe how a light source works under mesopic conditions. The calculation of the S/P may be expressed as:

$$S/P = \int_{380}^{780}P(\lambda)V'(\lambda)d\lambda \bigg/ \int_{380}^{780}P(\lambda)V(\lambda)d\lambda = \qquad(6)$$
$$t\int_{380}^{780}(k_1P_1+k_2P_2+k_3P_3+k_4P_4)V'(\lambda)d\lambda +$$
$$\frac{\int_{380}^{780}(b_1P_1+b_2P_2+b_3P_3+b_4P_4)V'(\lambda)d\lambda}{t\int_{380}^{780}(k_1P_1+k_2P_2+k_3P_3+k_4P_4)V(\lambda)d\lambda +}$$
$$\int_{380}^{780}(b_1P_1+b_2P_2+b_3P_3+b_4P_4)V(\lambda)d\lambda$$

where $P(\lambda)$ is the SPD of the destined light, $V'(\lambda)$ is the scotopic spectral sensitivity curve, $\lambda$ is the wavelength, $k_i$, $b_i$ are constants corresponding to the proportion of $i^{th}$ component light source. As shown, the S/P may be an inverse function expressed by the proportion of a component light (e.g., t).

The M/P ratio, which may represent LER under mesopic vision, is the ratio of mesopic luminous flux to photopic luminous flux, and may be deemed to represent the mesopic efficacy. Calculation of M/P may be expressed as:

$$M/P = \int_{380}^{780}P(\lambda)V_m(\lambda)d\lambda \bigg/ \int_{380}^{780}P(\lambda)V(\lambda)d\lambda = \qquad(7)$$
$$t\int_{380}^{780}(k_1P_1+k_2P_2+k_3P_3+k_4P_4)V_m(\lambda)d\lambda +$$
$$\frac{\int_{380}^{780}(b_1P_1+b_2P_2+b_3P_3+b_4P_4)V_m(\lambda)d\lambda}{t\int_{380}^{780}(k_1P_1+k_2P_2+k_3P_3+k_4P_4)V(\lambda)d\lambda +}$$
$$\int_{380}^{780}(b_1P_1+b_2P_2+b_3P_3+b_4P_4)V(\lambda)d\lambda$$

where $P(\lambda)$ is the SPD of the destined light, $V_m(\lambda)$ is a combination of $V(\lambda)$ and $V'(\lambda)$, as shown in equation (8). As shown, the M/P may be an inverse function of the spectrum proportion of a component light (e.g., t).

$$V_m(\lambda) = mV(\lambda) + (1-m)V'(\lambda) \qquad(8)$$

where m is a coefficient ranging from 0 to 1.

In step 735, the illumination spectrum of the destined light may be optimized according to the parameter of cirtopic efficiency. As described elsewhere in the disclosure, the cirtopic effect may relate to the non-visual biological reaction of a human. In some embodiments, the cirtopic effect may be taken into account in functional lighting. For a lighting device in a bedroom, the "sleep mode" may be set to adjust the light to optimize cirtopic effect. In another example, for traffic lighting, the cirtopic effect may be optimized to keep a driver alert. The C/P ratio, which represents the efficiency for circadian effect, is the ratio between circadian flux and radiant flux as shown in equation (7), where $C(\lambda)$ is the circadian action function.

$$C/P = \int_{380}^{780}P(\lambda)C(\lambda)d\lambda \bigg/ \int_{380}^{780}P(\lambda)V(\lambda)d\lambda = \qquad(9)$$
$$t\int_{380}^{780}(k_1P_1+k_2P_2+k_3P_3+k_4P_4)C(\lambda)d\lambda +$$
$$\frac{\int_{380}^{780}(b_1P_1+b_2P_2+b_3P_3+b_4P_4)C(\lambda)d\lambda}{t\int_{380}^{780}(k_1P_1+k_2P_2+k_3P_3+k_4P_4)V(\lambda)d\lambda +}$$
$$\int_{380}^{780}(b_1P_1+b_2P_2+b_3P_3+b_4\square_4)V(\lambda)d\lambda$$

where $P(\lambda)$ is the SPD of the destined light, $C(\lambda)$ is the circadian action function, $V(\lambda)$ is the photopic spectral sensitivity curve.

As shown, the C/P may be an inverse function of the spectrum proportion of a component light (e.g., t).

In step 736, the illumination spectrum of the destined light may be optimized according to the parameter of spectral reflectance luminous efficacy (SRLER). As defined in equation (1), SRLER can be expressed as:

$$SRLER = \frac{\int_{380}^{780}P(\lambda)V(\lambda)\rho(\lambda)d\lambda}{\int_{380}^{780}P(\lambda)d(\lambda)}$$

where $P(\lambda)$ is the SPD of the destined light, $V(\lambda)$ is the photopic spectral sensitivity curve, $\rho(\lambda)$ is the spectral reflectance curve of the illuminated object.

In step 737, the illumination spectrum of the destined light may be optimized for photosynthetic photon flux (PPF). Particular, PPF can be expressed by equation (10):

$$PPF = \int_{400}^{700}\frac{P(\lambda)\lambda d\lambda}{n_A hc} \qquad(10)$$
$$= \sum_{400}^{700}p(\lambda)\lambda\Delta\lambda/n_A hc$$
$$= \sum_{400}^{700}[(k_1t+b_1)P_1+\ldots+(k_4t+b_4)P_4]\lambda\Delta\lambda/n_A hc$$
$$= \sum_{400}^{700}(k_1P_1+\ldots+k_4P_4)\lambda\Delta\lambda t/n_A hc +$$
$$\sum_{400}^{700}(b_1P_1+\ldots+b_4P_4)\lambda\Delta\lambda/n_A hc$$

where $P(\lambda)$ is the SPD of the destined light produced by the lighting solution, $n_A$ is the Avogadro constant ($\mu mol^{-1}$), h is the Planck constant, c is speed of light. Another property named photosynthetic radiation flux can be expressed as $P_P = \int P(\lambda)Q(\lambda)d\lambda$, where $Q(\lambda)$ is the sensitive curve for photosynthesis of plant which is corresponding to the V ($\lambda$) for human. It should be noted that different kinds of plants may have different $Q(\lambda)$, even one plant may have different through different growing stages.

As shown, the PPF may be a linear function of the spectrum proportion of a component light (e.g., t).

In step 738, the illumination spectrum of the destined light may be optimized for the chromaticity light reflected by a target object. Particularly, in some embodiments, chromaticity coordinates of reflected light ($x_\rho$, $y_\rho$) may be an inverse function of the spectrum proportion of a component light (e.g., t).

In some embodiments, chromaticity of reflected light ($x_\rho$, $y_\rho$) may be derived from equation (11)-(17).

$$X_\rho = \int P(\lambda)\rho(\lambda)\bar{x}(\lambda)d\lambda \quad (11)$$
$$= \int [(k_1 t + b_1)P_1(\lambda) + \ldots + (k_4 t + b_4)P_4(\lambda)]\rho(\lambda)\bar{x}(\lambda)d\lambda$$
$$= (k_1 t + b_1)\int P_1(\lambda)\rho(\lambda)\bar{x}(\lambda)d\lambda + \ldots +$$
$$(k_4 t + b_4)\int P_4(\lambda)\rho(\lambda)\bar{x}(\lambda)d\lambda$$
$$= (k_1 t + b_1)X_{\rho 1} + \ldots + (k_4 t + b_4)X_{\rho 4}$$

$$Y_\rho = \int P(\lambda)\rho(\lambda)\bar{y}(\lambda)d\lambda \quad (12)$$
$$= (k_1 t + b_1)Y_{\rho 1} + \ldots + (k_4 t + b_4)Y_{\rho 4}$$

$$Z_\rho = \int P(\lambda)\rho(\lambda)\bar{z}(\lambda)d\lambda \quad (13)$$
$$= (k_1 t + b_1)Z_{\rho 1} + \ldots + (k_4 t + b_4)Z_{\rho 4}$$

$$x_\rho = \frac{X_\rho}{X_\rho + Y_\rho + Z_\rho} \quad (14)$$
$$= \frac{(k_1 t + b_1)X_{\rho 1} + \ldots + (k_4 t + b_4)X_{\rho 4}}{(k_1 t + b_1)(X_{\rho 1} + Y_{\rho 1} + Z_{\rho 1}) + \ldots + (k_4 t + b_4)(X_{\rho 4} + Y_{\rho 4} + Z_{\rho 4})}$$
$$= \frac{\left(\sum_{i=1}^{4} k_i X_{\rho i}\right) \cdot t + \sum_{i=1}^{4} b_i X_{\rho i}}{\left(\sum_{i=1}^{4} k_i (X_{\rho i} + Y_{\rho i} + Z_{\rho i})\right) \cdot t + \sum_{i=1}^{4} b_i (X_{\rho i} + Y_{\rho i} + Z_{\rho i})}$$

$$y_\rho = \frac{\left(\sum_{i=1}^{4} k_i Y_{\rho i}\right) \cdot t + \sum_{i=1}^{4} b_i Y_{\rho i}}{\left(\sum_{i=1}^{4} k_i (X_{\rho i} + Y_{\rho i} + Z_{\rho i})\right) \cdot t + \sum_{i=1}^{4} b_i (X_{\rho i} + Y_{\rho i} + Z_{\rho i})} \quad (15)$$

$$\begin{cases} x_\rho = \frac{a_x t + c_x}{bt + d} = \frac{a_x}{b} + \frac{(bc_x - a_x d)/b^2}{t + d/b} \\ y_\rho = \frac{a_y t + c_y}{bt + d} = \frac{a_y}{b} + \frac{(bc_y - a_y d)/b^2}{t + d/b} \end{cases} \quad (16)$$

$$y_\rho = = \frac{bc_y - a_y d}{bc_x - a_x d} \cdot x_\rho + \frac{a_y}{b} - \frac{a_x}{b} \cdot \frac{bc_y - a_y d}{bc_x - a_x d} \quad (17)$$

where $X_\rho$, $Y_\rho$, $Z_\rho$ are the tri-stimulus values of the color appearance reflected by the object, $X_{\rho i}$, $Y_{\rho i}$, $Z_{\rho i}$ are the tri-stimulus values of the each component light, $\bar{x}(\lambda)$, $\bar{y}(\lambda)$, $\bar{z}(\lambda)$ are the color matching functions (CMF) of the destined light, $P(\lambda)$ is the SPD of the destined light produced by the lighting solution, $P_1(\lambda)$, $P_2(\lambda)$, $P_3(\lambda)$, and $P_4(\lambda)$ are spectral power distribution (SPD) of respective four LEDs in a package, $\rho(\lambda)$ is the spectrum reflectance curve of the target object, $k_i$, $b_i$ are constants corresponding to the proportion of $i^{th}$ component light source, $a_i$, $c_i$, b, d are constants. $x_\rho$ and $y_\rho$ are chromaticity coordinates of reflected light, a desired chromaticity coordinate of reflected color appearance ($x_\rho$, $y_\rho$) may be acquired by choosing a proper t, so that ($x_\rho$, $y_\rho$) may be a property under optimization and can be optimized by giving a weight factor to the functions of tin equation (19).

As described above, equation (2) may be solved together with an additional equation based on a selected optimization parameter, such that proportions of the component lights ($a_1$, $a_2$, $a_3$ and $a_4$) may be obtained. In some embodiments, multiple optimization parameters may be considered individually. In other embodiments, multiple optimization parameters may be considered concurrently. Particularly, in some embodiments, multiple optimizations may be given different weight factors when considered together.

Accordingly, in step 730, multiple optimization parameters may be optimized concurrently by giving each parameter a weight factor or weight coefficient. Particularly, in some embodiments, a merit function can be used for considering multiple optimization parameters concurrently. In some embodiments, the merit function may be written as:

$$\text{Merit Function} = f(p_1, p_2 \ldots p_n) \quad (18)$$

where $n \geq 1$ and $p_1$, $p_2$ ... $P_n$ represent the one or more selected optimization parameters as described above. The merit function can represent the integrated impact on the destined light by various parameters. In some embodiments, one or more of the optimization parameters may have no effect on the calculation. In some embodiments, some optimization parameters may have greater effect on the calculation than other parameters.

More particularly, in some embodiments, a weight factor function can be used for considering multiple optimization parameters concurrently. For example, in some embodiments, three parameters LER, C/P and M/P are considered for spectrum optimization, and the weight factor function may be written as:

$$f(LER, C/P, M/P) = w_1 f(t)_{LER} + w_2 f(t)_{C/P} + w_3 f(t)_{M/P} \quad (19)$$

where $w_1$, $w_2$, $w_3$ are weight factors corresponding to LER, C/P and M/P, respectively. In various embodiments, weight factors for different parameters may be the same or different, according to particular needs under particular working conditions.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. In some embodiments, the sequential order in which various optimization parameters are considered may be changed. In some embodiments, some parameters may be left out from the spectrum optimization process. In some embodiments, the selection of parameters to be optimized may be based on conditions of the target object and/or its ambient environment.

Figure 8:
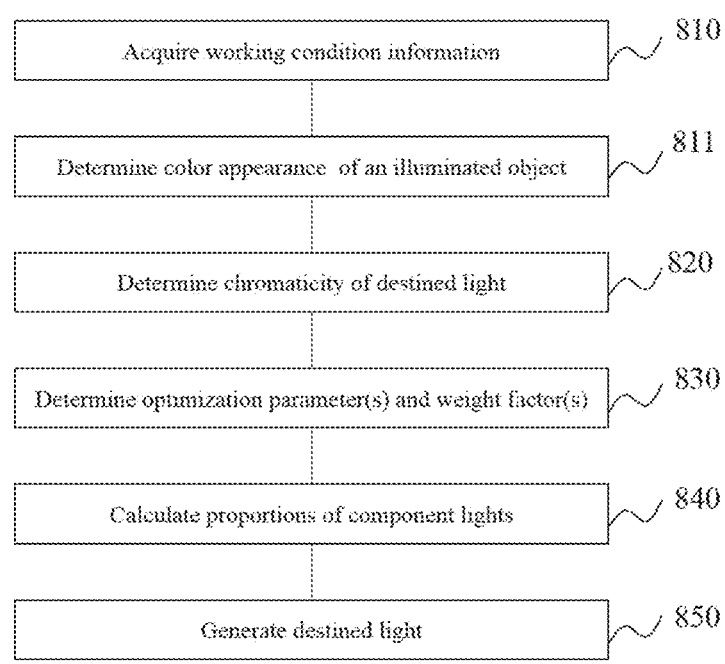
FIG. 8 is a flowchart illustrating an exemplary spectrum optimization process that takes into consideration the reflectance spectrum of the target object according to some embodiments of the present disclosure.

FIG. 8 is a flowchart illustrating an exemplary spectrum optimization process that takes into consideration the reflectance spectrum of the target object according to some embodiments of the present disclosure.

In step 810, information regarding the working condition may be acquired. For example, in some embodiments, the working condition information includes the reflectance spectrum of the target object.

In step 811 the desired color appearance of a target object under illumination of the destined light may be determined. For example, for landscaping lighting, sometimes reproducing lighting is preferred, while other times reshaping lighting is preferred. Particularly, in some embodiments, illumination spectrum is designed or optimized such that appearance of illuminated objects or environment (e.g., landscape) is similar to that under a natural condition (e.g., under sunlight in daytime). In these embodiments, illumination spectrum of the destined light may be optimized to mimic the spectrum of sunlight or white light. In other embodiments, illumination spectrum is designed or optimized such that appearance of illuminated objects or environment (e.g., landscape) unlike its natural appearance (e.g., simulate an unusual night effect). In these embodiments, illumination spectrum of the destined light may be optimized to achieve color enhanced effect for objects.

In step 820 the chromaticity of the destined light may be determined based on the desired chromaticity coordinates of light reflected by the illuminated object or environment. For example, if the color appearance of a target object under illumination is determined, the color mixing process for combining four component lights is similar to the previous example. The difference is that spectrum reflectance curve of the target object $\rho(\lambda)$ is also considered in the mixing process, and $P(\lambda)$ is replaced with $P(\lambda)\rho(\lambda)$. Thus, parameters $P_1(\lambda)\rho(\lambda)$, $P_2(\lambda)\rho(\lambda)$, $P_3(\lambda)\rho(\lambda)$, and $P_4(\lambda)\rho(\lambda)$ replace the original parameters $P_1(\lambda)$, $P_2(\lambda)$, $P_3(\lambda)$, and $P_4(\lambda)$, respectively, of the four component lights. Although $\rho(\lambda)$ is considered, it is deemed as a modification of the spectral power, and the intensity proportions of the four component lights $a_1$, $a_2$, $a_3$, and $a_4$ can still be expressed as $a_i = k_i t_i + b_i$. Consequently, the deduction of the SRLER is similar to that in equation (3), and the SRLER remains an inverse proportion function of t.

The destined chromaticity (x, y) of the destined light can subsequently be quantified with the use of a process similar to the one described above. The tristimulus value X of the destined light can be determined via equation (20) and the chromaticity coordinate x via equation (21), where $x_i$, $Y_i$, and $Z_i$ represent the tristimulus values of the $i^{th}$ component light, with i ranging from 1 to 4. Similarly, the chromaticity coordinate x is an inverse proportion function of t, as is y, and y is a linear function of x.

$$X = \int P(\lambda)\bar{x}(\lambda)d\lambda \quad (20)$$
$$= \int [(k_1 t + b_1)P_1(\lambda) + \ldots (k_4 t + b_4)P_4(\lambda)]\bar{x}(\lambda)d\lambda$$
$$= (k_1 t + b_1)\int P_1(\lambda)\bar{x}(\lambda)d\lambda + \ldots + (k_4 t + b_4)\int P_4(\lambda)\bar{x}(\lambda)d\lambda$$
$$= (k_1 t + b_1)X_1 + \ldots + (k_4 t + b_4)X_4$$

$$x = \frac{X}{X+Y+Z} \quad (11)$$
$$= \frac{(k_1 t + b_1)X_1 + \ldots + (k_4 t + b_4)X_4}{(k_1 t + b_1)(X_1 + Y_1 + Z_1) + \ldots + (k_4 t + b_4)(X_4 + Y_4 + Z_4)}$$
$$= \frac{\left(\sum_{i=1}^{4} k_i X_i\right) \cdot t + \sum_{i=1}^{4} b_i X_i}{\left(\sum_{i=1}^{4} k_i (X_i + Y_i + Z_i)\right) \cdot t + \sum_{i=1}^{4} b_i (X_i + Y_i + Z_i)}$$

After determining chromaticity of the destined light, one or more optimization parameters may be determined. In some embodiments, multiple optimization parameters may be considered concurrently by giving each parameter a weight factor (coefficient), and the proportions of component lights may be determined in step 840.

In step 850, the driver unit 220 may control the component light sources according to the proportion determined in step 840.

Similarly to the process described in relation to FIGS. 6 through 8, the present method can be used for combining more than four component lights. For example, for combining n number of component lights, Equation (2) becomes:

$$\begin{cases} \left(\begin{array}{c} a_1 l_1 + a_2 l_2 + \ldots + \\ a_i l_i + \ldots a_n l_n \end{array}\right) x = a_1 l_1 x_1 + a_2 l_2 x_2 + \ldots + a_i l_i x_i + \ldots a_n l_n x_n \\ \left(\begin{array}{c} a_1 l_1 + a_2 l_2 + \ldots + \\ a_i l_i + \ldots a_n l_n \end{array}\right) y = a_1 l_1 y_1 + a_2 l_2 y_2 + \ldots + a_i l_i y_i + \ldots a_n l_n x_n \\ a_1 + a_2 + \ldots + a_i + \ldots a_n = 1 \end{cases} \quad (2)'$$

where, $x_i$, $y_i$ is the chromaticity coordinate of the $i^{th}$ component light; x, y is the chromaticity coordinate of the destined light; $a_i$ is the proportion of the $i^{th}$ component lights; $l_i$, is the sum of tri-stimulus value of the $i^{th}$ component lights. As used herein, the tri-stimulus value refers to the amount of the three primary colors in a tri-chromatic additive color model, such as in the 1931 CIE XYZ color space.

Equation (2)' is to be solved for unknown factors $a_i$. Under this scenario, to optimize the solution of equation (2)', for different working conditions, the proportions of the different component lights may be defined to correlate with one another in various forms. In some embodiments, the particular correlation between proportions of different component lights may be defined according to practical needs and/or goals under a particular working condition. In some embodiments, the particular correlations may be defined according to one or more optimization parameters, such as but not limited to luminous efficacy (LE), color rendering index (CRI) and luminous efficacy of radiation (LER), photopic efficacy, mesopic efficacy, circadian efficacy of radiation (CER) for non-visual biological effects, the spectral reflectance luminous efficacy of radiation (SRLER), photosynthetic photon flux (PPF) or a combination thereof. In some embodiments, the particular correlations may affect one or more optimization parameters with respect to one or more proportions of the component lights.

For example, in some embodiments, proportions of component lights may correlate with a multivariate function. Particularly, in some embodiments, the number of variances in the multivariate function varies with the number of component lights. For example, in some embodiments that combine 5 component lights, the multivariate function may be written as:

$$a_i = k_{i1} t_1 + k_{i2} t_2 + c_i \quad (3)'$$

where where $k_{i1}$ denotes the proportion corresponding to the $i^{th}$ component light with respect to $t_1$, $k_{i2}$ denotes the proportion corresponding to the $i^{th}$ component light with respect to $t_2$, and $c_i$ is a constant corresponding to the $i^{th}$ component light.

In other embodiments, proportions of some component lights may correlate in one particular form, while proportions of other component lights may correlate in a different form. Such as, $$\begin{cases} a_1 + a_2 = 0.5 \\ a_3 + a_4 + a_5 = 0.5 \end{cases} \quad (3)''$$

where $a_1$, $a_2$, $a_3$, $a_4$, and $a_5$ are proportions of five different component lights respectively.

It should be noted that the above description about the functional correlations between proportions of different component lights is merely exemplary and for illustrative purposes, and should not be understood as the only embodiments. Various modifications to the disclosed embodiments will be readily apparent to those skilled in the art, and the general principles defined herein may be applied to other embodiments and applications without departing from the spirit and scope of the present disclosure.

EXAMPLES

The following examples are for illustrative proposes only and should not be interpreted as limitations of the claimed invention. There are a variety of alternative techniques and procedures available to those of ordinary skill in the art which would similarly permit one to successfully perform the intended invention.

Example 1

Figure 9:
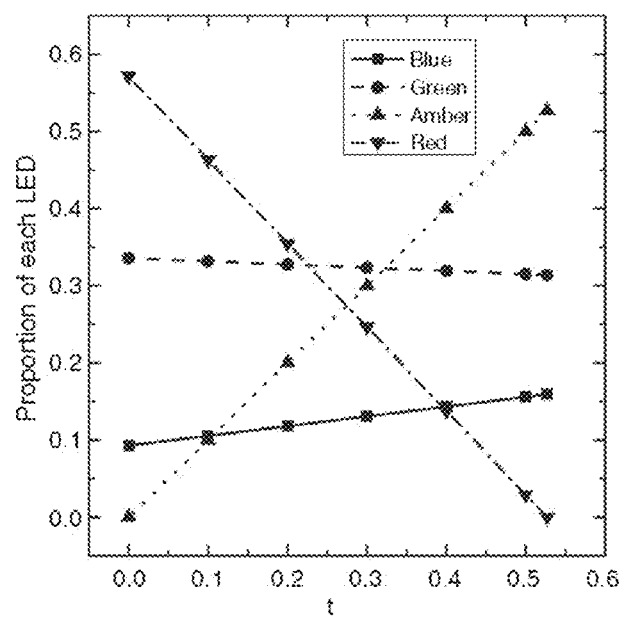
FIG. 9 illustrates the result of the proportion of each light source based on a determined chromaticity coordinate of the light mixture according to some embodiments of the present disclosure.

Relationship Between the Proportions of the LED Sources in Application of Four-package LED for High Performance FIG. 9 illustrates the result of the proportion of each light source based on a determined chromaticity coordinate of the light mixture according to some embodiments of the present disclosure.

Four different LEDs may be used as light sources. The color of the LEDs may be red, amber, green and blue. Their chromaticity coordinates may be R (0.6849, 0.3151), A (0.6046, 0.3953), G (0.1221, 0.5706) and B (0.1496, 0.0421). The color-mixing point used herein may have a color temperature of 4000K with chromaticity coordinates (0.3805, 0.3768). Suppose the proportion of the amber LED to be coefficient t, the other LED proportions may be solved from equation (3). The results is shown as equation (22).

$$\begin{cases} f(t)_R = -1.0848t + 0.571563 \\ f(t)_A = t \\ f(t)_G = -0.0415t + 0.33579 \\ f(t)_B = 0.126302t + 0.092646 \end{cases} \quad (22)$$

where $f(t)_R$, $f(t)_A$, $f(t)_G$, $f(t)_B$ may be the proportions of red, amber, green and blue LED as a function of t. The slopes of the four linear functions are different. As shown, the proportion of green LED or blue LED changes slowly with respect to t, and the proportion of red LED changes fast with respect to t.

Figure 10:
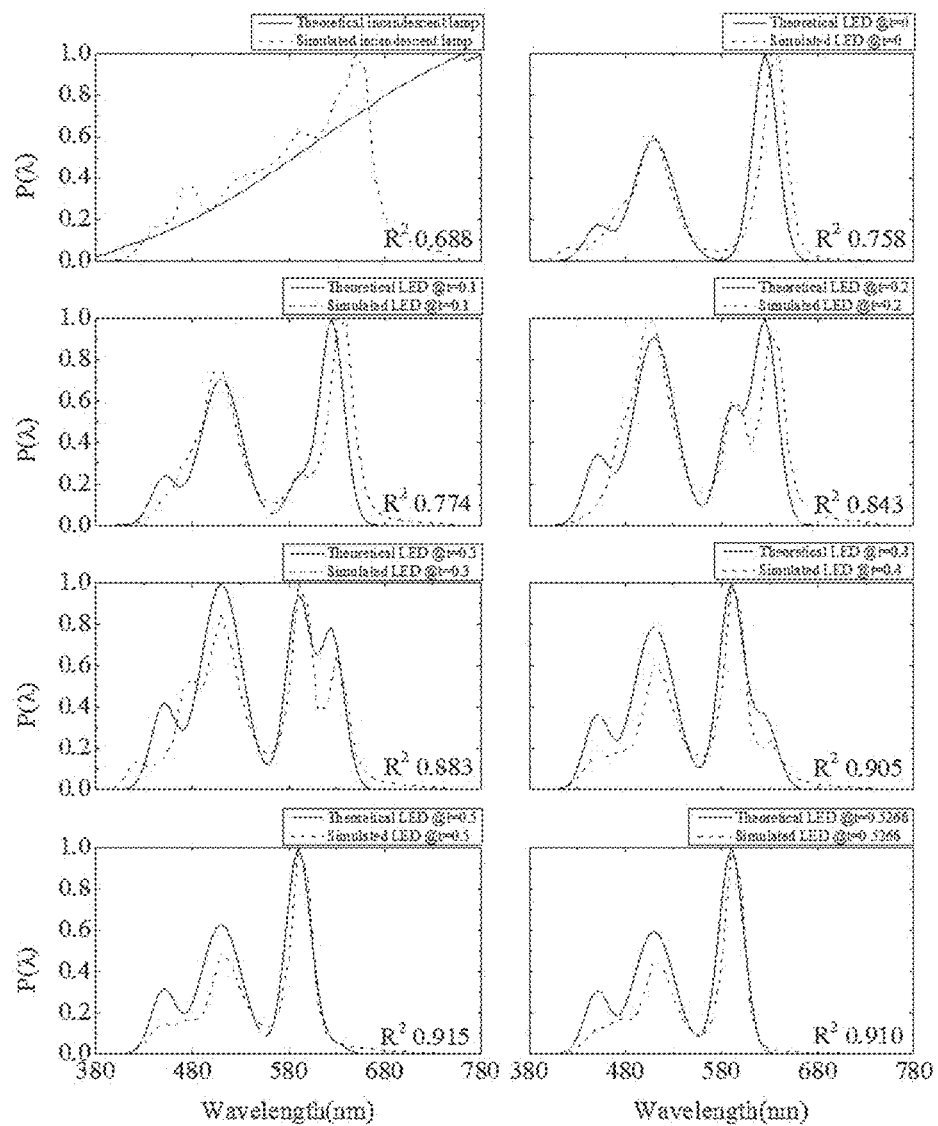
FIG. 10 illustrates the simulated spectrum of incandescent lamp and four-packages LEDs using 11 channels LED cube with fit goodness.
Figure 11:
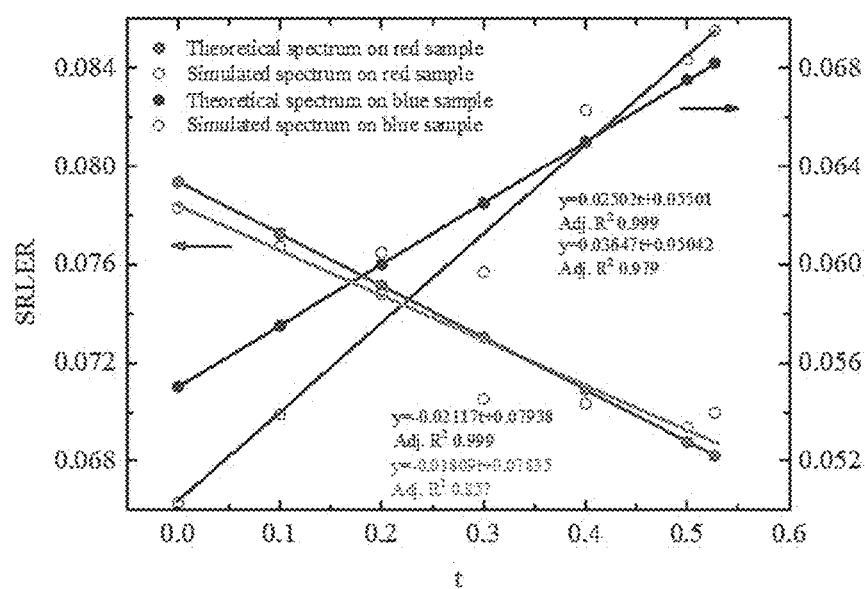
FIG. 11 illustrates the linear fit of SRLER and t of theoretical and simulated four-package LEDs.

Incandescent lamp and 7 kinds of four-package LEDs with different t values derived from equation (20) are used in the experiment. Simulated spectrums are shown in FIG. 10 but limited to the LED cube. Corresponding inverse proportion function of four-package LEDs on red and blue samples are $y=(-0.177t+0.620)/(-0.177t+7.82)$ and $y=(0.183t+0.430)/(-0.177t+7.817)$ respectively. However, in a small range, they are very approximate to linear function as shown in FIG. 11.

Example 2

Figure 12:
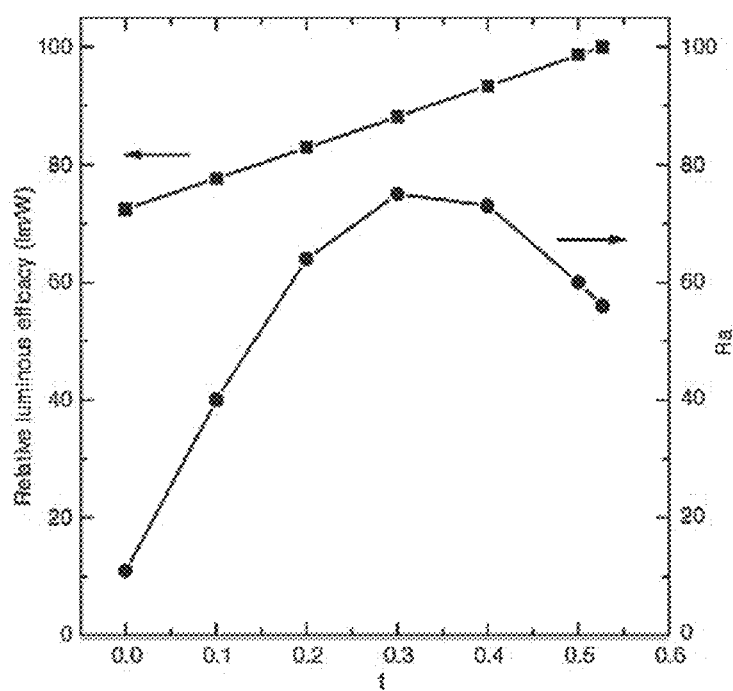
FIG. 12 illustrates the relationship between LE, CRI and the proportion of a light source in a four-package LED system according to some embodiments of the present disclosure.

Relationship Between the Optimization Parameters and the Proportion of a Light Source in a Four-package LED System FIG. 12 illustrates the relationship between LE, CRI and the proportion of a light source in a four-package LED system comprising red, amber, green and blue LEDs. The proportion of the amber LED may be supposed to be t. The chromaticity coordinates of the four LEDs may be R (0.6849, 0.3151), A (0.6046, 0.3953), G (0.1221, 0.5706) and B (0.1496, 0.0421). The color-mixing point used here may have a color temperature of 4000K with chromaticity coordinates (0.3805, 0.3768).

The target of the optimization may be to achieve high LE and good color rendering. As shown, the LE may be a linearly monotonically increasing/decreasing function of proportion for all the combinations of four-package LEDs. As for LE, relative value would be of concern in the embodiment, and may be normalized to its maximum value of 100 lm/W. The CRI may range from 0 to 100 in terms of the general CRI (Ra). After calculate the LE and the CRI (Ra) as a function of t, the results may be seen in FIG. 10. For LE, the result may be a linear function; while for CRI, the result may be a single peak function of proportion.

For different applications, requirements may be different for optimizations. Merely by way of example, for outdoor lighting, a CRI of over 50 may be good enough, and the higher the effective LE the better. So the coefficient t may be around 0.5. For indoor lighting, high color rendering may be needed. Considering the requirement of LE, the coefficient t may be set to 0.3.

Figure 13A:
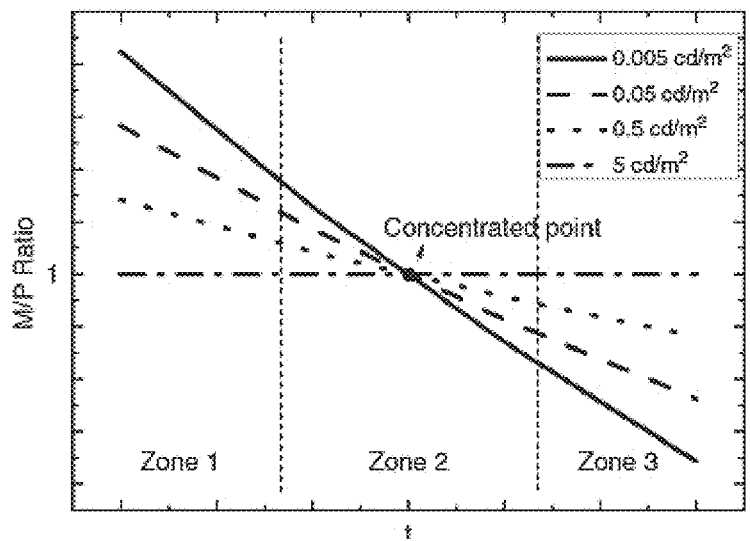
FIGS. 13A-13C illustrate the mesopic efficacy at different luminances according to some embodiments of the present disclosure.
Figure 13B:
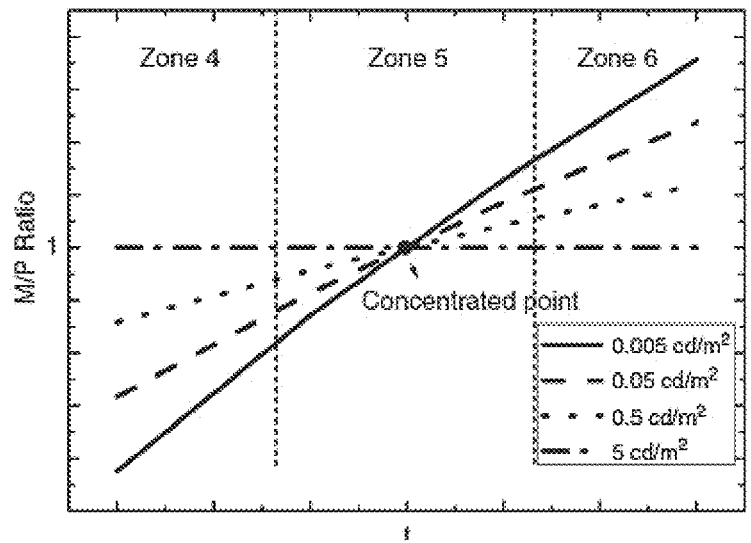
Figure 13C:
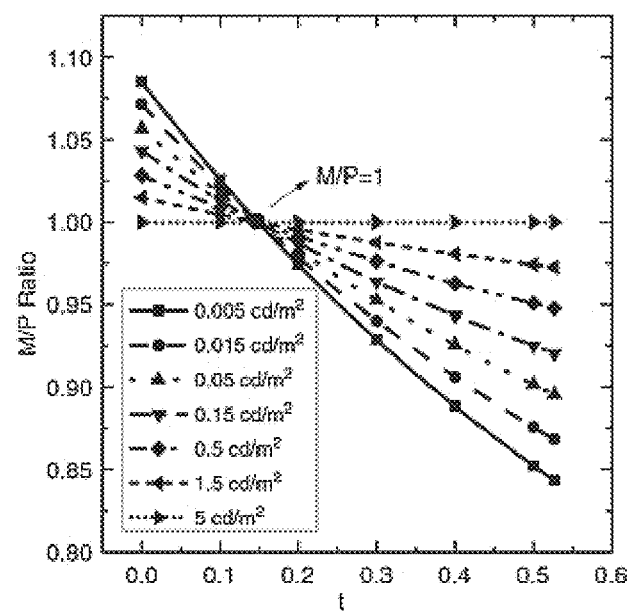

FIG. 13A, FIG. 13B and FIG. 13C illustrate the mesopic efficacy at different luminances.

In some embodiments, the light sources of the lighting system 500 are R (0.6849, 0.3151), A (0.6046, 0.3953), G (0.1221, 0.5706) and B (0.1496, 0.0421). The proportion of the amber LED may be supposed to be t.

Under mesopic vision, the mesopic spectral sensitivity curve may be a combination of photopic and scotopic spectral sensitivity curves as shown in equation (8). The coefficient m equals 0 for $L_{mes} \leq 0.005$ cd/m$^2$; $m=0.767+0.3334 \log(L_{mes})$ for $0.005$ cd/m$^2 < L_{mes} < 5$ cd/m$^2$; $m=1$ for $L_{mes} \geq 0.005$ cd/m$^2$.

The S/P ratio may be calculated in equation (7) to be $f(t)_{S/P}=(0.4702t+3.3820)/(2.2525t+3.1176)$. The M/P ratio may be modified by $f(t)_{M/P}=(1-m) f(t)_{S/P}+m$. For different combinations of LEDs, there may be one combination where $f(t)_{S/P}=1$, and $f(t)_{M/P}=1$ at any luminance, which is denoted as the concentrated point in FIG. 13A and FIG. 13B. Although $f(t)_{M/P}$ may show inverse proportion functions, they would converge to the point where the M/P ratio equals 1. The converged point may appear in meaningful regions or not. In engineering applications, the inverse proportion functions may have has two types. One is monotonic increasing and the other is monotonic decreasing. When both independent variable and dependent variable are positive, each type may be divided into three zones as shown in FIG. 13A and FIG. 13B.

At different luminances, different formulas may be deduced. For example, $f(t)_{M/P}=f(t)_{S/P}$, at 0.005 cd/m$^2$, $f(t)_{M/P}=0.8411f(t)_{S/P}+0.1589$ at 0.015 cd/m$^2$, $f(t)_{M/P}=0.6668f(t)_{S/P}+0.3332$ at 0.05 cd/m², $f(t)_{M/P}=0.5077f(t)_{S/P}+0.4923$ at 0.15 cd/m², $f(t)_{M/P}=0.3334f(t)_{S/P}+0.6666$ at 0.5 cd/m², $f(t)_{M/P}=0.1743f(t)_{S/P}+0.8257$ at 1.5 cd/m², and $f(t)_{M/P}=1$ at 5 cd/m², respectively.

The M/P ratios of different combinations of four-package LEDs at 4000K at different luminances are shown in FIG. 13C. Compared to the M/P ratio of FIG. 13A and FIG. 13B, these may belong to zone 2, type 1. At different luminance, the M/P ratio may change over a large range, from about 0.85 to 1.1. Such great differences may mean that spectrum optimization would be very important for energy saving. In this embodiment, it is obvious that a high M/P ratio with a maximum reaching to about 1.1 leads to high mesopic efficacy, and may be the optimization result ignoring other factors.

FIG. 14 illustrates the optimization process considering LER, C/P and S/P ratio.

In some embodiments, the light sources of the lighting system 500 are R (0.6849, 0.3151), A (0.6046, 0.3953), G (0.1221, 0.5706) and B (0.1496, 0.0421). The proportion of the amber LED may be supposed to be t.

LER, C/P ratio and S/P ratio may be expressed by the proportion the LEDs (e.g. t).

$$f(t)_{LER}=(2.2525t+3.1176)/(-1.766t+7.8167), \quad (23)$$

$$f(t)_{C/P}=(0.5565t+2.4175)/(2.2525t+3.1176), \quad (24)$$

$$f(t)_{S/P}=(0.4702t+3.3820)/(2.2525t+3.1176). \quad (25)$$

where $f(t)_{LER}$, $f(t)_{C/P}$, $f(t)_{S/P}$ denotes the LER, C/P ratio and S/P ratio as functions of t.

Figure 14A:
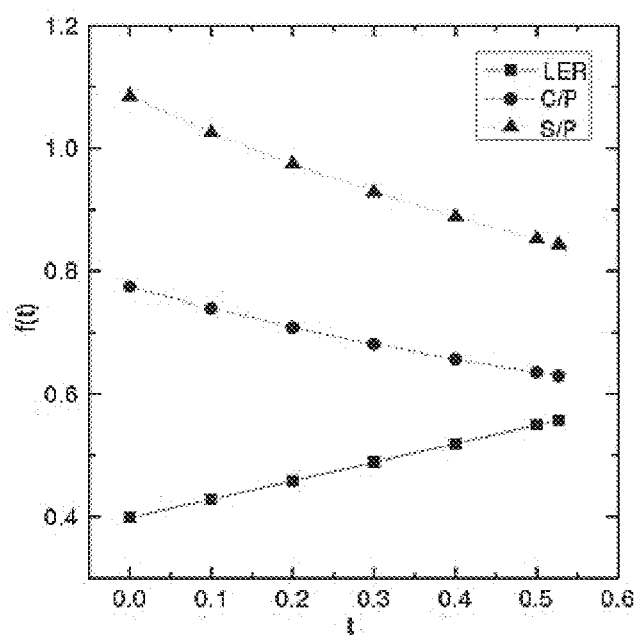
FIG. 14A and FIG. 14B illustrate the optimization process considering LER, C/P and S/P ratio according to some embodiments of the present disclosure.
Figure 14B:
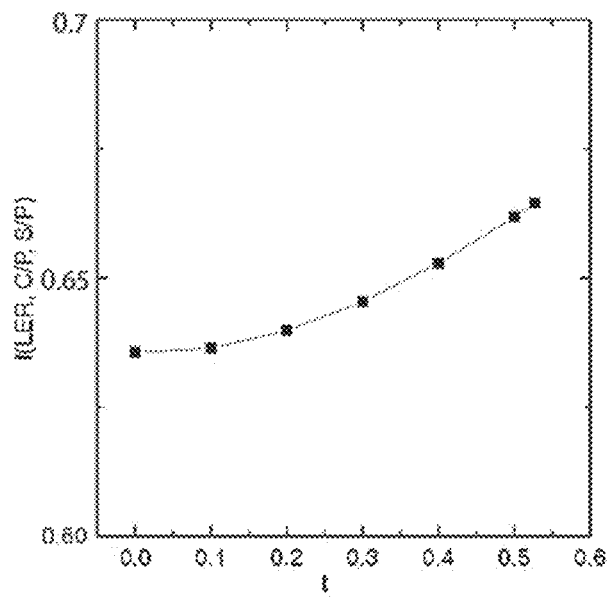

LER, C/P and S/P as functions of coefficient t of different combinations of LEDs are shown in FIG. 14A. In some embodiments, different properties may be of different importance, and it may be necessary to weight each property. After all properties have been weighted, equation (26) may be used to optimize the spectrum.

$$f(LER, C/P, M/P)=w_1 f(t)_{LER}+w_2 f(t)_{C/P}+w_3 f(t)_{M/P} \quad (26)$$

where $w_1$, $w_2$, $w_3$ are weight factors corresponding to respective optimization parameters. The sum of all the weights may be equal to 1 to make different optimizations comparable. Suppose that the four-package LED lighting system 500 is to be used for road lighting, where LER may of most importance although the S/P ratio may also important to ensure a high mesopic efficacy. While for C/P, the desired value might depend on population density of the area in which the lamps are to be deployed. If it is designed to avoid disruption of human sleep patterns, the C/P ratio may be small and have a minus weight. If it is designed to help keep drivers' alertness high during nighttime, the C/P ratio may be high and have a positive weight. In this application, the system may be designed to keep the drivers alert, so the C/P ratio may be chosen to be small. The weight coefficients may be set to be $w_1:w_2:w_3=0.7:-0.1:0.4$. The curve of the function f(LER, C/P, M/P) based on the chosen weight coefficients is shown in FIG. 14B. It should be noticed that the weights given to different properties not only differ for different embodiments but also differ for different design purpose.

Example 3

Figure 15:
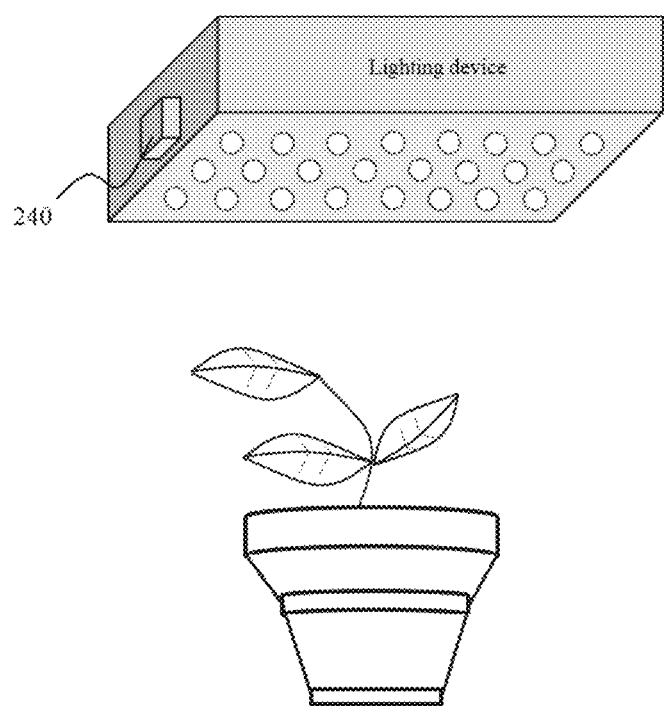
FIG. 15 illustrates an exemplary embodiment of an artificial lighting solution for indoor plantations.

Selection of Spectrum Optimization Parameters According to a Target Object's Ambient Environment FIG. 15 illustrates an exemplary embodiment of an artificial lighting solution for indoor plantations. Particularly, at initial stages of planting, the main purpose is to promote vigorous plant growth. Thus, the illumination spectrum of the lighting solution is set to have a dominant proportion of wavelengths that plants absorb for photosynthesis. Particularly, photosynthetic pigments contained in plants have strong light absorption and characteristic absorption spectra. For example, chlorophyll absorbs strongly in two regions: 660 to 640 nm (red light) and 430 to 450 nm (blue violet light). Absorption of orange, yellow and especially green light is very little. Carotene and lutein are different from chlorophyll, they only absorbing visible light in the blue violet region Particularly, in some embodiments involving agricultural lighting, the parameter of photosynthetic photon flux (PPF) may be considered. As used herein, the term "photosynthetic photon flux" or "PPF" refers to the ratio of flux for photosynthesis to the number of absorbed photon, which can be expressed by equation (10).

At later stages, plant growth slows down, and the main purpose of the plantation becomes indoor ornamenting. Thus, the illumination spectrum of the lighting solution is adjusted to accommodate different needs. For example, the amount of photosynthesis-stimulating lights may be reduced to control plant growth. On the other hand, reflected efficiency, color rendering, and non-visual biological effect and other aesthetic factors of the lighting solution may become more important considerations at this stage. Color of illumination light and that reflected from illuminated objects together decide the atmosphere created by the lighting solution. For example, illumination light matching the environment helps to create a sense of space and improve the lighting effect. Thus, various ambient conditions, such as time, weather, season, background (ambient) color, may affect the choices of an illumination spectrum. Particularly, affording weights to the various considerations, such as color rendering, reflected efficiency, non-visual biological effect, and other esthetic factors, a synthesized chromaticity coordinate may be decided for the destined light, component lights having desirable properties (e.g. color and wavelength composition) may be chosen, and their mixing proportions may be calculated according to the methods described above. In this way the lighting system 1300 gives a quantitative solution for spectrum optimization of indoor plantation lighting.

Example 4

Spectrum Optimization to Reach Destined Color Temperature

Figure 16:
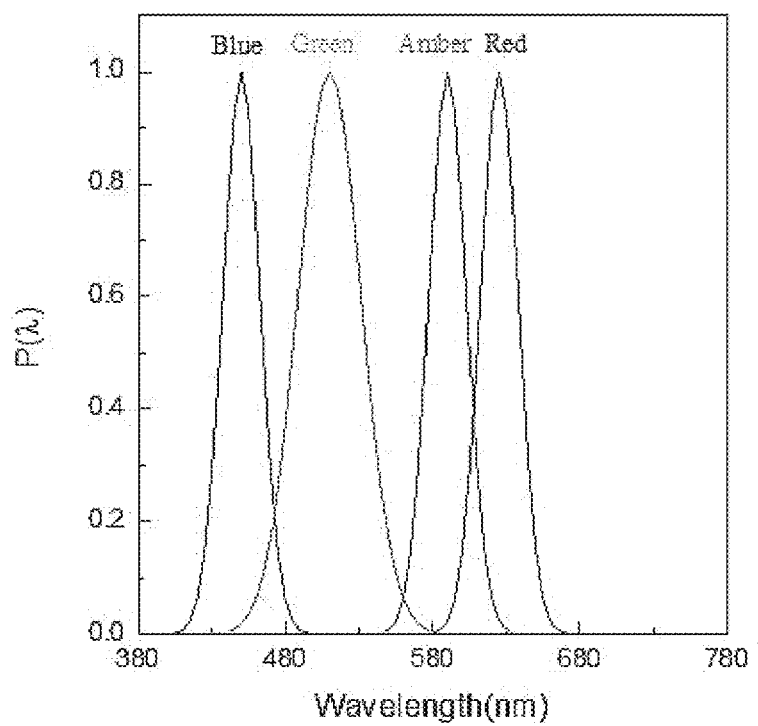
FIG. 16 is an embodiment of color mixing of four-package LED at different color temperature.
Figure 17:
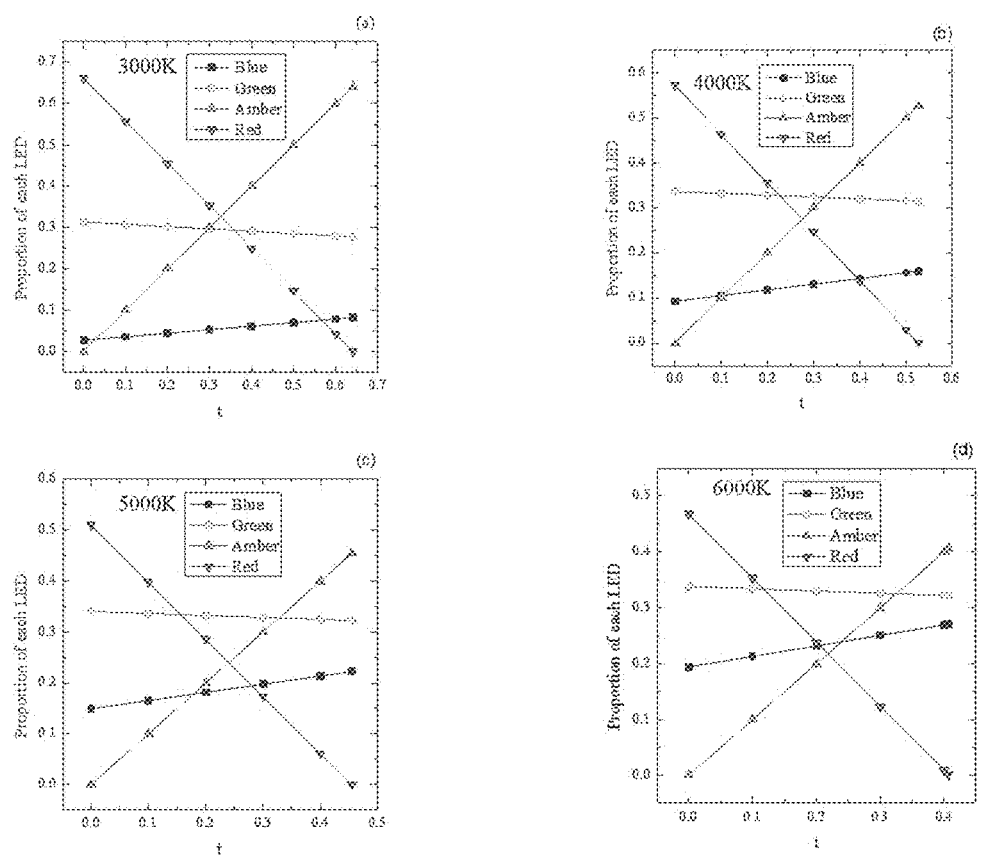
FIG. 17 shows the proportion of each LED as a function of t for color mixing of four CCTs according to some embodiments of the present disclosure.

FIG. 16 is an embodiment of color mixing of four-package LED at different color temperature. Four different LEDs, red, amber, green and blue LED are used in the study with their chromaticity coordinates R (0.1496, 0.0421), A (0.1221, 0.5706), G (0.6047, 0.3953), and B (0.6849, 0.3151) as shown in FIG. 17. Synthesized correlated color temperature (CCTs) of component light sources are 3000K, 4000K, 5000K, and 6000K, respectively. Linear functions corresponding to the four CCTs are shown in equation (25) to (28), and proportion of each LED as a function of t for color mixing of the four CCTs are shown in FIG. 17.

Figure 18:
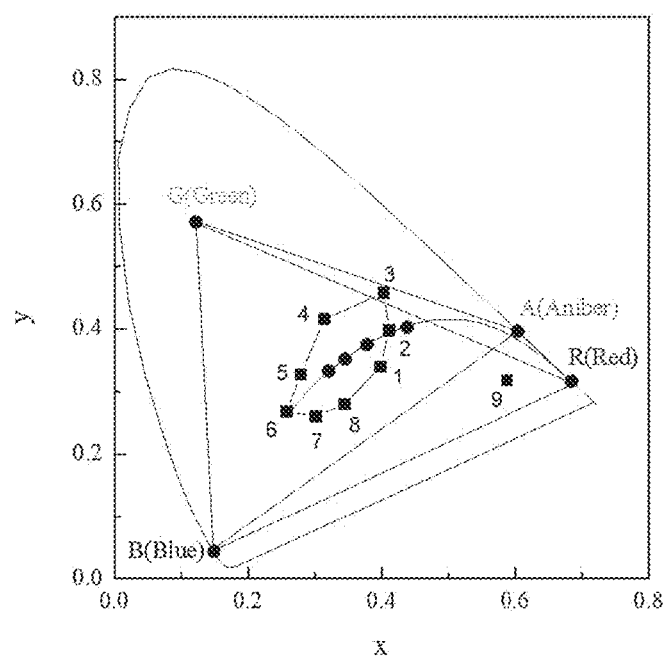
FIG. 18 shows CRI color samples with their chromaticity coordinates according to some embodiments of the present disclosure.
Figure 19:
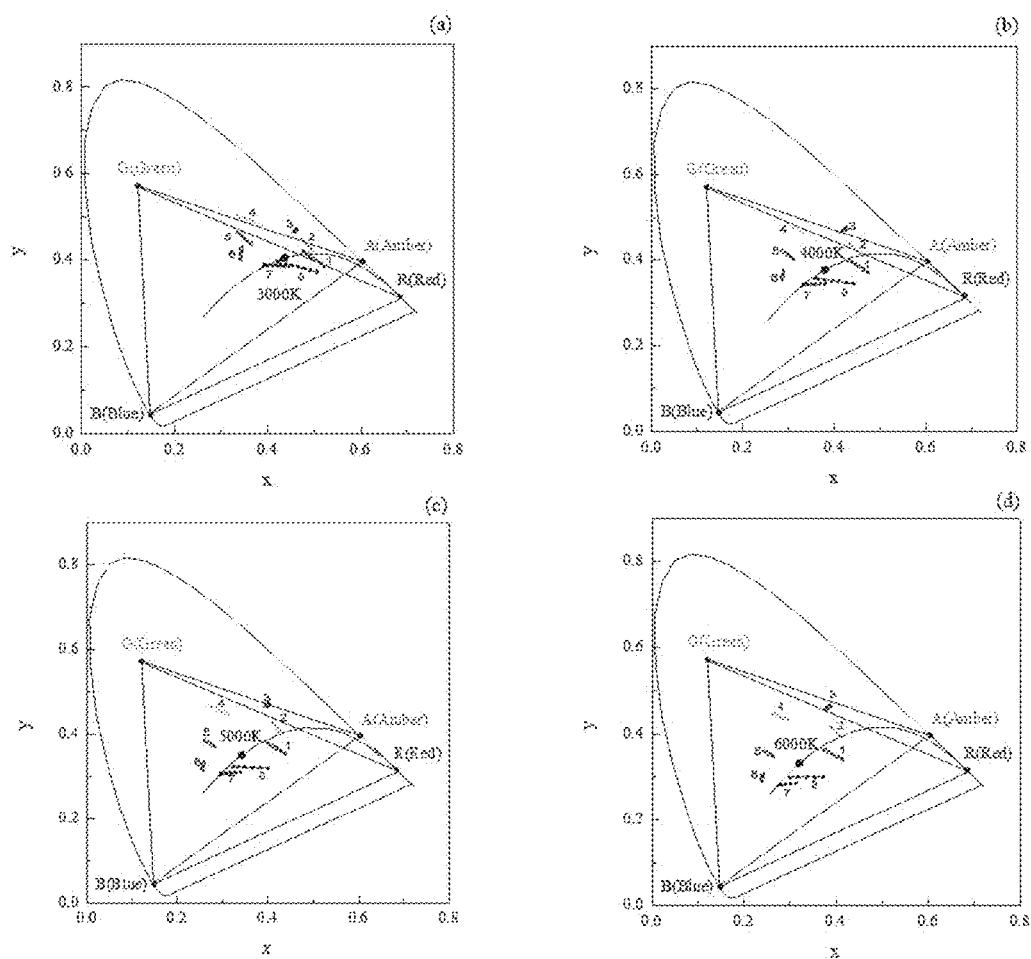
FIG. 19 shows chromaticity coordinates on eight general color samples according to some embodiments of the present disclosure.
Figure 20:
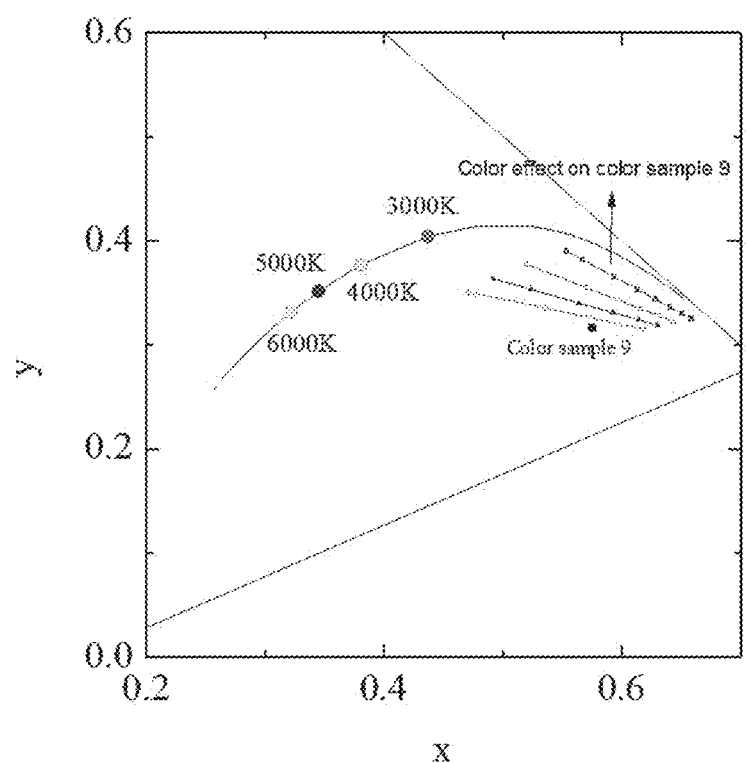
FIG. 20 shows color effect changing under different CCTs light sources according to some embodiments of the present disclosure.

CRI color samples with their chromaticity coordinates shown in FIG. 18 are taken as illuminated objects in this example. Chromaticity coordinates as a function of t for color mixing of four-package LED at 3000K, 4000K, 5000K and 6000K on eight general color samples are shown in FIG. 19, which conform to linear function at each different color temperature. Low color temperature light sources make illuminated object more biased to warm color, while high color temperature light sources make illuminated object more biased to cold color. Take color effect on color sample 9 in FIG. 20 for example, and see that how color effect change under different CCTs of light sources. With the change of CCT of light sources, color effect form a color strip, following a same trend with CCTs. Calculating chromatic aberration in CIE 1976 uv uniform color space by transforming chromaticity coordinates from xy chromatic diagram to uv chromatic diagram. Maximum color aberrations $\Delta C=\sqrt{(u_2-u_1)^2+(v_2-v_1)^2}$ of color samples under four-package LEDs with different CCTs are shown in Table 2. Color aberrations vary in a relative large range, and purity does not directly influence them. In FIG. 20, maximum chromatic aberration at 3000K, 4000K, 5000K, and 6000K are 0.1352, 0.1409, 0.1441, and 0.1459 respectively.

TABLE 2

Maximum color aberration of color samples under four-package LEDs with different CCTs

| Maximum color aberration | CCT (K) | | | | Purity(%) of color sample |
|---|---|---|---|---|---|
| | 3000 | 4000 | 5000 | 6000 | |
| Color sample 1 | 0.0482 | 0.0423 | 0.0384 | 0.0358 | 22.2 |
| Color sample 2 | 0.0276 | 0.0231 | 0.0205 | 0.0189 | 43.7 |
| Color sample 3 | 0.0024 | 0.0035 | 0.0041 | 0.0045 | 59.3 |
| Color sample 4 | 0.0298 | 0.0244 | 0.0215 | 0.0196 | 20.7 |
| Color sample 5 | 0.0246 | 0.0197 | 0.0170 | 0.0153 | 18.5 |
| Color sample 6 | 0.0093 | 0.0076 | 0.0070 | 0.0066 | 31.1 |
| Color sample 7 | 0.0376 | 0.0332 | 0.0299 | 0.0275 | 21.8 |
| Color sample 8 | 0.0690 | 0.0631 | 0.0582 | 0.0546 | 22.3 |

Figure 21:
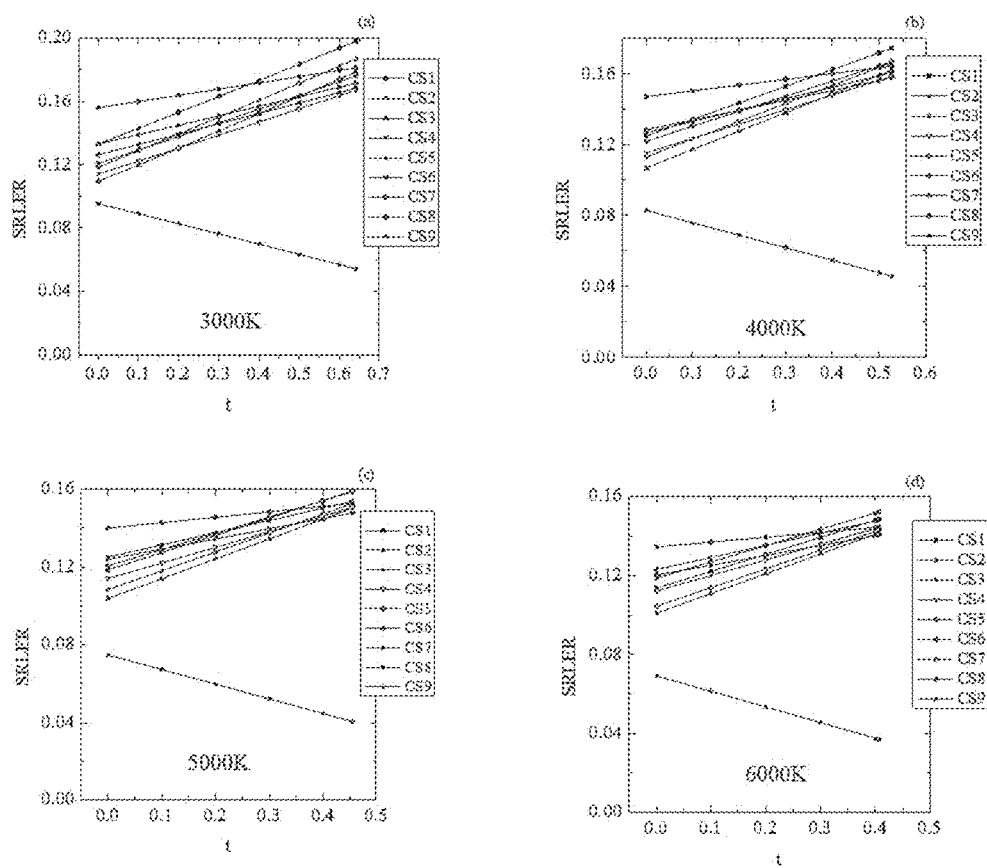
FIG. 21 shows SRLER as function of t for color mixing of four-package at 3000K, 4000K, 5000K and 6000K according to some embodiments of the present disclosure.
Figure 22:
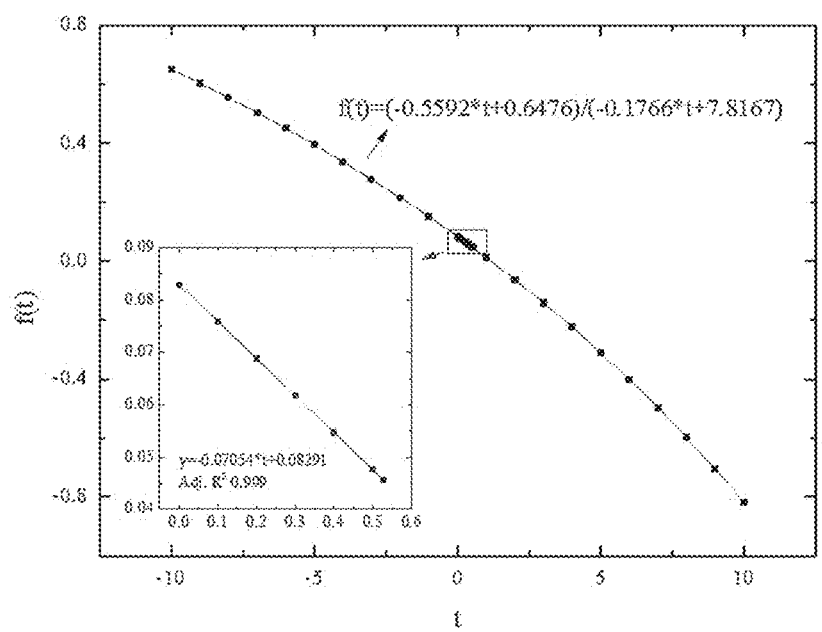
FIG. 22 shows SRLER as function of t for color mixing of four-package at 4000K on a color sample according to some embodiments of the present disclosure.

As deduced above, SRLER is inverse proportion function of t, and SRLER as a function of t for color mixing of four-package LED at 3000K, 4000K, 5000K and 6000K are shown in FIG. 21. In the range shown in FIG. 21, SRLER is very likely to be linear function of t. Take color sample 9 for example, SRLER at 4000K on color sample 9 as inverse proportion function of t is shown in FIG. 22, when t is in a large range, it conforms to inverse proportion function. However, for parameter t in a small meaningful range, make linear fit of SRLER of t in FIG. 22 with adj. $R^2$ 0.999, it is a perfect linear function. So SRLER and t can be taken as linear relationship, and maybe more convenient in some applications. At different CCTs, SRLERs of four-package LED vary a little. CCT of light source is not the main factor influence SRLER. It is spectrum reflectance characteristic that influence SRLER much. Color sample 9 is more saturated than other eight general color samples, and SRLERs of color sample 9 under light sources vary greatly. SRLERs for eight general color samples vary from about 10% to 50%, while variance of sample 9 reaches to about 100% or more.

$$\begin{cases} f(t)_R = -1.03043*t + 0.660622 \\ f(t)_A = t \\ f(t)_G = -0.05567*t + 0.312587 \\ f(t)_B = 0.086092*t + 0.026791 \end{cases} \quad (27)$$

$$\begin{cases} f(t)_R = -1.0848*t + 0.571563 \\ f(t)_A = t \\ f(t)_G = -0.0415*t + 0.33579 \\ f(t)_B = 0.126302*t + 0.092646 \end{cases} \quad (28)$$

-continued $$\begin{cases} f(t)_R = -1.12218*t + 0.510343 \\ f(t)_A = t \\ f(t)_G = -0.03878*t + 0.340239 \\ f(t)_B = 0.160965*t + 0.149417 \end{cases} \quad (29)$$

$$\begin{cases} f(t)_R = -0.14826*t + 0.467635 \\ f(t)_A = t \\ f(t)_G = -0.04006*t + 0.338147 \\ f(t)_B = 0.188317*t + 0.194218 \end{cases} \quad (30)$$

where $f(t)_i$ denotes the proportion of $i^{th}$ monochromatic light source as function of t.

Example 5

Spectrum Optimization to Reach Destined Chromaticity

Figure 23A:
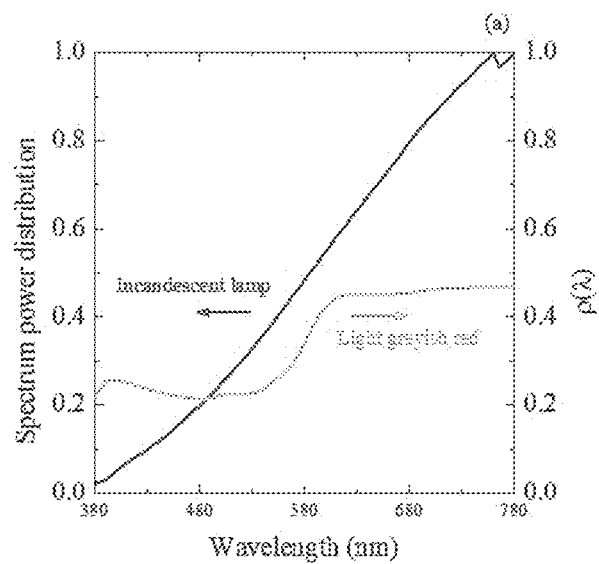
FIG. 23A shows incandescent lamp as light source and light greyish red as color sample according to some embodiments of the present disclosure.
Figure 23B:
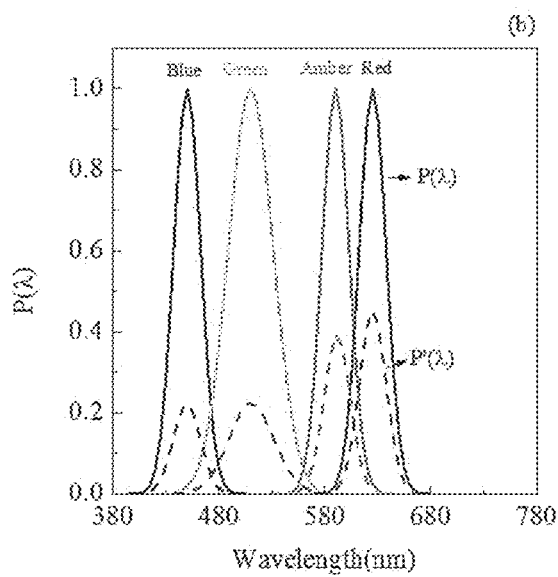
FIG. 23B shows the spectrum power distribution of four LEDs and spectrum reflected from color sample light greyish red according to some embodiments of the present disclosure.
Figure 24:
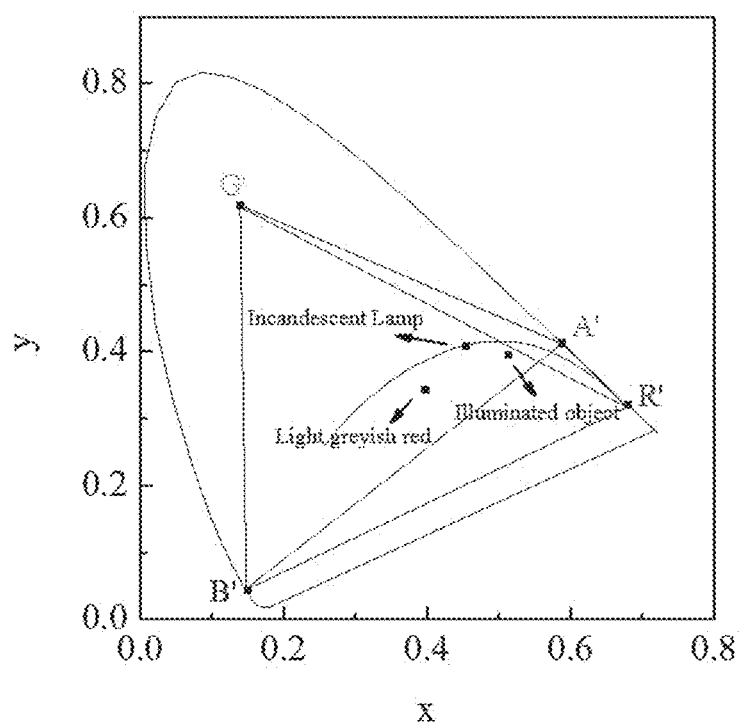
FIG. 24 shows the chromaticity coordinates of incandescent lamp, light greyish red and illuminated color according to some embodiments of the present disclosure.
Figure 25:
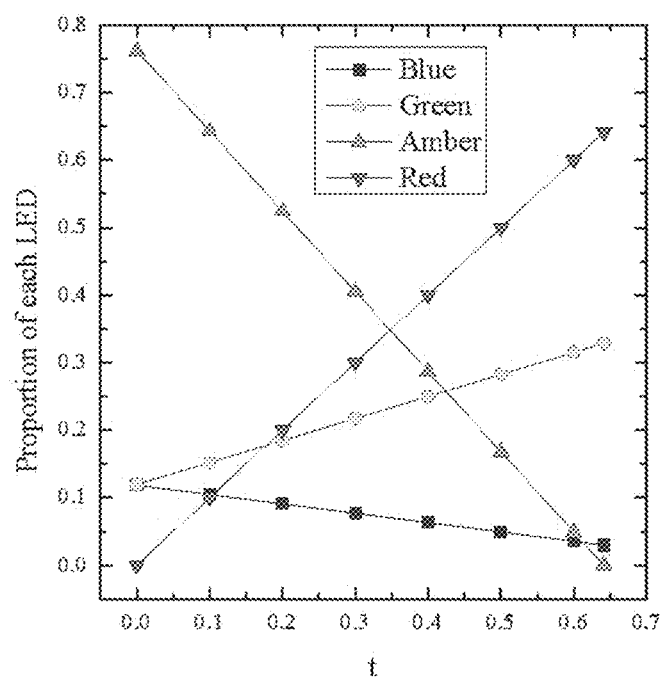
FIG. 25 shows the proportion of each LED as a function of t for color mixing of destined target chromaticity according to some embodiments of the present disclosure.
Figure 26:
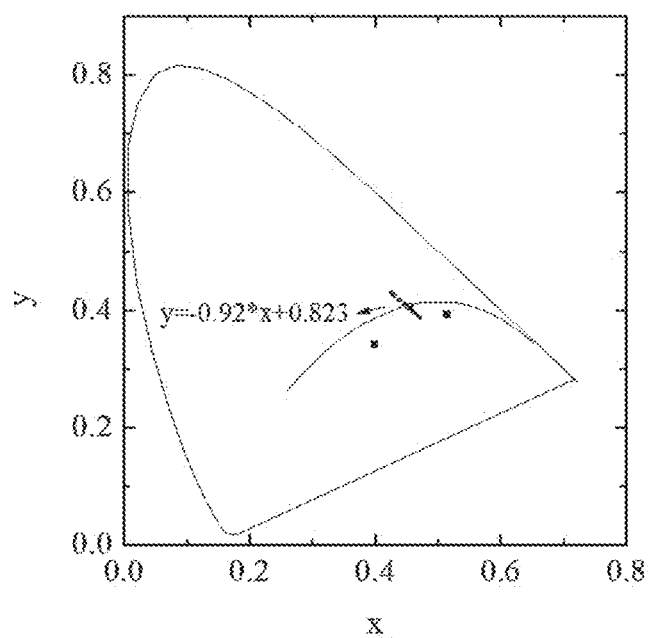
FIG. 26 shows the chromaticity coordinates of four-package LEDs following linear function according to some embodiments of the present disclosure.
Figure 27:
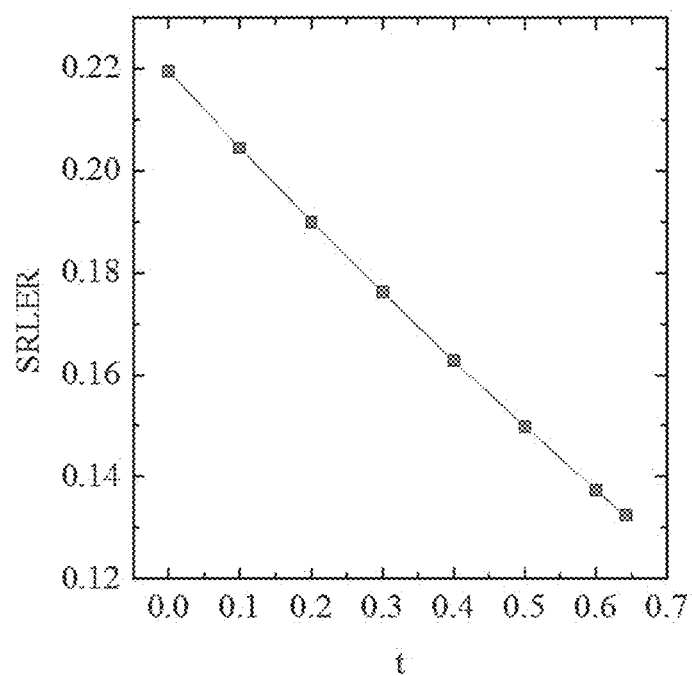
FIG. 27 shows SRLER of spectrum of four-package LEDs as inverse proportion function of t according to some embodiments of the present disclosure.

In some applications, people are more concerned about color effect of objects, and it requires illuminated object to reach destined chromaticity. In this part, color mixing of four-package LED to reach destined target chromaticity has been shown. Incandescent lamp as light source and light greyish red as color sample have been taken as reference in FIG. 23A. To simulate color effect of light greyish red under incandescent lamp, use the four LEDs mentioned in Example 4 above with spectrum power $P(\lambda)$, and obtain $P(\lambda)\rho(\lambda)$, denoted as $P'(\lambda)$. Chromaticity coordinates of $P'(\lambda)$ of four LEDs are R' (0.67887, 0.32113), A' (0.58663, 0.41336), G' (0.13769, 0.61965), and B' (0.14858, 0.04404), and chromaticity coordinates of incandescent lamp (0.45437, 0.40658), light greyish red (0.3983, 0.34233), illuminated object color (0.51381, 0.39339) are all shown in FIG. 24. Color mixing of R', A', G', and B' for illuminated object color, and obtain proportion of each LED as a function of t in FIG. 25 with linear function shown in equation (31). Chromaticity coordinates of all the four-package LEDs are linear function relationship as shown in FIG. 26 located around incandescent lamp. Maximum chromatic aberration $\Delta C$ reaches to 0.0477. SRLER of spectrum of four-package LEDs are inverse proportion function of t shown in FIG. 27 ranging from 0.13 to 0.22, and relative difference reaches to about 70%.

$$\begin{cases} f(t)_R = t \\ f(t)_A = -1.18783*t + 0.761926 \\ f(t)_G = 0.326112*t + 0.119559 \\ f(t)_B = -1.13828*t + 0.118516 \end{cases} \quad (31)$$

The examples set forth above are provided to give those of ordinary skill in the art a complete disclosure and description of how to make and use the embodiments of the arrangements, devices, compositions, systems and methods of the disclosure, and are not intended to limit the scope of what the inventors regard as their disclosure. All patents and publications mentioned in the specification are indicative of the levels of skill of those skilled in the art to which the disclosure pertains.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations that is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps. In particular, it will be understood that various modifications may be made without departing from the spirit and scope of the present disclosure. Accordingly, other embodiments are within the scope of the following claims.

It should be also appreciated that the above described method embodiments may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method implemented on a computing device having at least on processor, at least one computer-readable storage medium, and a communication port for providing artificial lighting under a working condition, the method comprising:
   determining a destined chromaticity of a destined light;
   selecting one or more component lights, each component light having a component chromaticity;
   determining a proportion for each component light based on a merit function, wherein the merit function comprises at least one optimization parameter having a first functional correlation with the proportion of at least one component light; and
   combining the one or more component lights according to the one or more proportions, thereby synthesizing the destined light.

2. The method of claim 1, wherein the first functional correlation is a linear function, an inverse function, an exponential function, a logarithmic function, a power function or a regular non-linear function.

3. The method of claim 1, wherein the one or more proportions of the one or more component lights assumes a second functional correlation with respect to each other.

4. The method of claim 2, wherein the second functional correlation is a linear function or a multivariate function.

5. The method of claim 1, wherein before the determining a destined chromaticity of a destined light, the method further comprises acquiring information of the working condition.

6. The method of claim 5, wherein the information is one or more selected from the group consisting of a reflectance spectrum of a target object, color appearance of a target object under the artificial lighting, a condition of an ambient environment, and a purpose of the artificial lighting.

7. The method of claim 6, wherein the reflectance spectrum of the target object depends on a spectrum power distribution of the destined light and a spectral reflectance curve of the target object.

8. The method of claim 5, wherein the acquiring information of the working condition is performed by receiving the information via a user input or detecting the information via a sensor.

9. The method of claim 1, wherein before the determining a proportion for each component light, the method further comprises selecting the at least one optimization parameter.

10. The method of claim 9, wherein the at least one parameter is selected from the group consisting of luminous efficacy, luminous efficacy of radiation, color rendering index, color temperature, circadian efficacy of radiation, mesopic efficacy of radiation, luminous efficacy in scotopic vision, spectral reflectance luminous efficacy of radiation, photosynthetic photon flux, and chromaticity of light reflected by a target object.

11. The method of claim 1, wherein the merit function is configured to afford differential weight to the at least one optimization parameter.

12. The method of claim 1, wherein the determining a destined chromaticity of a destined light is based on a chromaticity of light reflected by a target object under the artificial illumination.

13. The method of claim 1, wherein the one or more component lights include four component lights.

14. The method of claim 1, wherein at least one of the one or more component lights is monochromatic or polychromatic.

15. A system for providing an artificial lighting under a working condition, the system comprising:
   a plurality of light sources, each light source capable of emitting a component light having a component chromaticity;
   a computer-readable storage medium storing executable instructions, and
   at least one processor in communication with the computer-readable storage medium, when executing the executable instructions, causing the system to implement a method, comprising:
   determining a destined chromaticity of a destined light and selecting one or more component lights, each component light having a component chromaticity;
   determining a proportion of each selected component light based on a merit function, wherein the merit function comprises at least one optimization parameter having a first functional correlation with the proportion of at least one component light; and
   combining the one or more component lights according to the proportion, thereby synthesizing the destined light.

16. The system of claim 15, wherein the system is caused to implement the method further comprising acquiring working condition information including a reflectance spectrum of a target object detected by one or more sensors.

17. The system of claim 16, wherein the working condition information further comprises luminance, color, temperature, weather, climate, or time of an ambient environment.

18. The system of claim 16, wherein the first functional correlation is defined according to the working condition information.

19. The system of claim 15, wherein at least one of the plurality of light sources is a LED, a polychromatic LED, a multi-packaged LED, a phosphor-converted LED, a high pressure sodium lamp, or a fluorescent lamp.

20. The system of claim 15, wherein the system is caused to implement the method further comprising controlling a magnitude of current or voltage delivered to each light source, thereby individually controlling an amount of component light emitted by the corresponding light source.

* * * * *